United States Patent
Afzal et al.

(10) Patent No.: US 11,704,608 B2
(45) Date of Patent: Jul. 18, 2023

(54) SESSION-BASED TRANSPORTATION DISPATCH

(71) Applicant: Lyft, Inc., San Francisco, CA (US)

(72) Inventors: Danial Afzal, San Francisco, CA (US);
Ido Avigdor Bright, Seattle, WA (US);
Jianzhe Luo, Seattle, WA (US); Jimmy Young, San Francisco, CA (US); Ryan Chung Leung, Fremont, CA (US);
Jatin Chopra, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 529 days.

(21) Appl. No.: 15/858,738

(22) Filed: Dec. 29, 2017

(65) Prior Publication Data

US 2019/0205812 A1 Jul. 4, 2019

(51) Int. Cl.
*G06Q 10/06* (2023.01)
*G06Q 50/30* (2012.01)
(Continued)

(52) U.S. Cl.
CPC ....... *G06Q 10/063114* (2013.01); *G06N 7/01* (2023.01); *G06Q 50/30* (2013.01);
(Continued)

(58) Field of Classification Search
CPC ............ G06Q 10/063114; G06Q 50/30; H04L 67/12; H04L 67/14
See application file for complete search history.

(56) References Cited

U.S. PATENT DOCUMENTS 9,551,992 B1 1/2017 Barton-Sweeney et al.
9,813,510 B1 * 11/2017 Nickels .................. G06Q 50/30
(Continued)

FOREIGN PATENT DOCUMENTS

JP 2015-122108 A 7/2015
WO WO 2017-136226 A1 8/2017

OTHER PUBLICATIONS

"A Hybrid Model on Predicting Passenger Demand for Chauffeured Car Service", by Wei et al., Department of Computer Science and Technology, Tsinghua University, China. CIKM' 16, Oct. 24-28, 2016, Indianapolis, IN, USA. (Year: 2016).*
(Continued)

*Primary Examiner* — Pan G Choy
(74) *Attorney, Agent, or Firm* — Keller Preece PLLC

(57) ABSTRACT

The present application discloses an improved transportation matching system, and corresponding methods and computer-readable media. According to disclosed embodiments, a transportation matching system receives session information from a requestor computing device in response to one or more session events. The system utilizes the received session information to determine a likelihood that the associated session on the requestor computing device will result in a transportation request. If the determined likelihood is above a threshold amount, the system generates an upfront dispatch that matches the associated session to a provider computing device. The system then reserves the provider computing device and generates a predicted dispatch for the reserved provider computing device.

20 Claims, 13 Drawing Sheets

(51) Int. Cl.
*G06Q 10/0631* (2023.01)
*H04L 67/14* (2022.01)
*H04W 4/40* (2018.01)
*G06N 7/01* (2023.01)
*H04L 67/12* (2022.01)
*G06N 7/00* (2023.01)

(52) U.S. Cl.
CPC .............. *H04L 67/12* (2013.01); *H04L 67/14* (2013.01); *H04W 4/40* (2018.02)

(56) References Cited

U.S. PATENT DOCUMENTS

| | | | | |
|---|---|---|---|---|
| 10,082,793 B1* | 9/2018 | Glaser | .............. | G06Q 10/06314 |
| 2010/0299177 A1* | 11/2010 | Buczkowski | .... | G06Q 10/06311 |
| | | | | 705/7.13 |
| 2015/0161554 A1 | 6/2015 | Sweeney et al. | | |
| 2015/0161564 A1 | 6/2015 | Sweeney et al. | | |
| 2016/0209220 A1 | 7/2016 | Laetz | | |
| 2016/0364657 A1 | 12/2016 | Bryant et al. | | |
| 2017/0147959 A1 | 5/2017 | Sweeney et al. | | |
| 2017/0186126 A1* | 6/2017 | Marco | .................... | G06Q 50/30 |
| 2018/0189669 A1* | 7/2018 | Jeon | ........................ | G06N 20/00 |
| 2018/0268510 A1* | 9/2018 | Edakunni | .............. | H04W 64/00 |

OTHER PUBLICATIONS

"Predicting Taxi-Passenger Demand Using Streaming Data", by Moreira-Matias et al., IEEE Transactions on Intelligent Transportation Systems, vol. 14, No. 3, Sep. 2013. (Year: 2013).*
"A Taxi Order Dispatch Model based On Combinatorial Optimization", by Zhang et al., Didi Research Institute, Didi Chuxing, Beijing China 100085. KDD 2017 Applied Data Science Paper, Halifax, NS, Canada. (Year: 2017).*
International Search Report & Written Opinion as received in PCT/US2018/066982 dated Apr. 26, 2019.
U.S. Appl. No. 61/914,890, filed Dec. 11, 2013, "Intelligent Dispatch System for Selecting Service Providers," Sweeney et al.

* cited by examiner

SESSION-BASED TRANSPORTATION DISPATCH

BACKGROUND

The popularity and utilization of mobile app-based transportation matching systems has grown significantly in recent years. Through such a transportation matching system, a requestor utilizes a requestor computing device to generate and send a transportation request including a pickup location and destination location. The system then matches the transportation request to a provider computing device associated with a transportation provider, after which the provider transports the requestor to the destination location. Generally, conventional transportation matching systems match received transportation requests to provider computing devices based on proximity (e.g., a proximity of a pickup location to a location of a provider computing device). However, conventional transportation matching systems often inefficiently match transportation requests to provider computing devices.

For example, conventional systems typically only account for, and match, transportation requests received within a limited window of time. When matching the transportation requests with providers, conventional systems typically optimize the matching process based on the pickup locations of the transportation requests and the current locations of the providers. However, matches that are determined optimal one moment, might be particularly inefficient the next. To illustrate, in some situations a provider might have just been matched to a transportation request that requires a significant amount of travel to get to the pickup location when a subsequent transportation request is received with a pickup location right next to the provider's current location. Furthermore, there may be no additional providers within the area, thereby resulting in a subsequent match that requires another provider to travel into the area. This results in wasted time for providers and requestors alike, as well as increased cancelations of transportation requests when requestors are not willing to wait for providers to arrive. This leads to delayed transportation request processing times, failed transportation requests, and inefficient system management.

Accordingly, a need exists for a transportation matching system capable of more effectively and efficiently accounting for future transportation requests that are likely to be received within a threshold amount of time.

BRIEF DESCRIPTION OF THE DRAWINGS

The detailed description refers to the drawings briefly described below.

DETAILED DESCRIPTION

Figure 1:
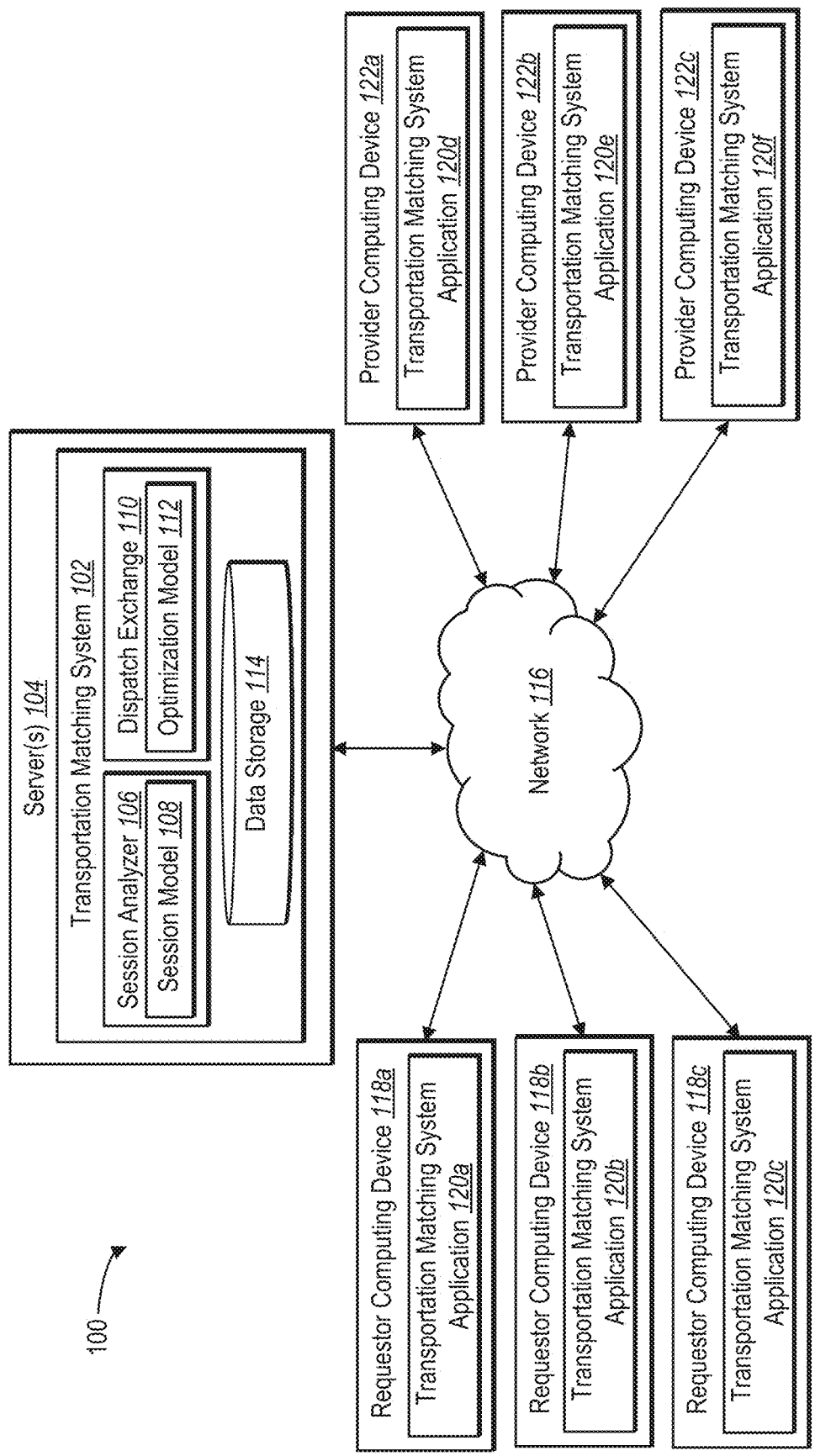
FIG. 1 illustrates an environmental diagram of the transportation matching system in accordance with one or more embodiments.

This application discloses various embodiments of a transportation matching system, computer readable media, and corresponding methods that provide benefits and/or solve the foregoing problems in the art. In accordance with one or more embodiments, a transportation matching system utilizes session information associated with a transportation matching system application on a requestor computing device to determine whether the requestor computing device is likely to generate and send a transportation request. Based on this determination, the transportation matching system might match the transportation request to a provider computing device or even dispatch the provider computing device to account for the likelihood that the requestor computing device will generate and send a transportation request, even though the requestor computing device has not yet done so. Additionally, based on the likelihood determination, the transportation matching system can provide specific provider information to the requestor computing device prior to the generation of the transportation request. In this way, and as will be described in greater detail below, the transportation matching system operates more quickly and efficiently, and increases the efficient use of system resources by accounting for future transportation requests based on active sessions.

To further illustrate the features and functionality of the transportation matching system, in one or more embodiments, the transportation matching system determines the likelihood that a requestor computing device will generate a transportation request in response to a detected session event. As used herein, a "session" refers to a period of use associated with a transportation matching system application installed on a requestor computing device. Also, as used herein, a "session event" refers to user-initiated application events within a session of the transportation matching system application. In one or more embodiments, the transportation matching system utilizes a trained session model to determine the likelihood that a requestor computing device will generate a transportation request based on detected session events.

In at least one embodiment, the transportation matching system detects session events including when the transportation matching system application is opened on the requestor computing device, when a pickup location is configured or selected in the transportation matching system application on the requestor computing device, when a destination location is configured or selected in the transportation matching system application on the requestor computing device, when a transportation type is changed or reconfigured in the transportation matching system application on the requestor computing device, and when the transportation matching system application is closed on the requestor computing device.

In response to detecting a session event in connection with a transportation matching system application installed on a requestor computing device, the transportation matching system utilizes the session information—including the detected session events and any other information about the session (e.g., the selected pickup and dropoff locations, historical request and session information for the requestor, and the current location of the requestor computing device)—to determine a likelihood that the requestor computing device will generate a transportation request. For example, in some embodiments the transportation matching system provides the session information as an input to the trained session model. In one or more embodiments, the trained session model outputs a likelihood that the requestor computing device will generate and send a transportation request. Additionally, in at least one embodiment, the trained session model also outputs an estimated time-to-request associated with the determined likelihood that represents an estimated amount of time until the requestor computing device will generate and send the request.

In at least one embodiment, the transportation matching system updates the likelihood associated with the requestor computing device each time a new session event is detected in connection with the requestor computing device. For example, session events generally follow a progression (e.g., open application, set pickup location, set destination location, change transportation type, submit request), and each step in the progression reflects either an increase or decrease in the likelihood that the requestor computing device will generate a transportation request. Accordingly, each time the transportation matching system detects a session event associated with the same session, the transportation matching system provides the requestor computing device's updated session information to a trained session model to determine an updated likelihood that the requestor computing device will generate a transportation request.

In one or more embodiments, the transportation matching system generates an upfront dispatch based on the likelihood determination output by the trained session model. As used herein, an "upfront dispatch" refers to a preliminary match made between a provider computing device and a requestor computing device based on a session currently active on a requestor computing device, but before a transportation request is received from the requestor computing device. For example, in some embodiments, if the transportation matching system determines that a transportation request is likely to be received based on an active session (e.g., if the determined likelihood is higher than a predetermined threshold), the transportation matching system generates an upfront dispatch by weighting the session information and then providing the weighted session information to a dispatch exchange that preliminarily matches the requestor computing device to a provider computing device (e.g., based on a current location or selected pickup location of the requestor computing device and a current location of the provider computing device).

In at least one embodiment, and as part of the upfront dispatch, the transportation matching system reserves the matched provider computing device. For example, the transportation matching system can reserve the matched provider computing device such that it cannot be matched to any other transportation requests or sessions by the dispatch exchange. The transportation matching system can reserve the matched provider until the transportation matching system receives the expected transportation request from the requestor computing device. Alternatively, the transportation matching system can reserve the matched provider for only a predetermined amount of time (e.g., 8 seconds). If the transportation matching system receives the expected transportation request in that amount of time, the transportation matching system dispatches the reserved provider computing device. If the transportation matching system does not receive the expected transportation request in that amount of time, the transportation matching system can release the provider computing device from reserved status.

Additionally or alternatively, depending on the strength of the determined likelihood and/or the time-to-request, the transportation matching system can predictively dispatch the matched provider computing device. For example, if the determined likelihood is within a predetermined threshold range (e.g., 60%-75% likely) and/or the time-to-request is below a threshold amount of time (e.g., within 20 seconds), the transportation matching system can generate a predicted dispatch for the matched provider computing device that informs the provider of an area where a future request is likely to be received. In at least one embodiment, the predicted dispatch does not identify the requestor, the requestor computing device, or the specific location of the requestor.

Additionally or alternatively, if the determined likelihood is very high (e.g., above 95% likely) and/or the time-to-request is very soon (e.g., within the next 5 seconds), the transportation matching system can dispatch the provider computing device to the location of the requestor computing device associated with the session information. In that embodiment, the transportation matching system may dispatch the provider computing device as if the transportation request had already been received. Thus, when the determined likelihood is high, the transportation matching system can mask the fact that the dispatch is based on a predicted transportation request rather than a transportation request that has already been received.

Additionally, based on the determined likelihood and the time-to-request, the transportation matching system can provide an indication of the generated upfront dispatch to the requestor computing device (e.g., via a transportation matching system application on the requestor computing device). For example, if the determined likelihood is high and/or the time-to-request is within a threshold amount of time (e.g., 10 seconds), the transportation matching system can provide information to the requestor computing device that identifies the preliminarily matched provider computing device as well as additional information associated with the matched provider computing device (e.g., provider rating, preferred languages, current location, route to pickup location, ETA). In at least one embodiment, the transportation matching system may only provide the indication of the generated upfront dispatch to the requestor computing device after the provider computing device has accepted the predicted dispatch or dispatch.

In response to eventually receiving an expected transportation from a requestor computing device, the transportation matching system can automatically dispatch the previously matched provider computing device. For example, in at least one embodiment, the transportation matching system dispatches the provider computing device without providing the received transportation request to dispatch exchange. At this point, the transportation matching system continues by providing dispatch information to both the requestor computing device and the provider computing device. The provider associated with the provider computing device can then transport the requestor associated with the requestor computing device according to the pickup and destination locations specified in the received transportation request.

As such, the present transportation matching system provides a computer-based solution to an existing problem in efficiently utilizing system resources when matching transportation requests to provider computing devices. Namely, the transportation matching system determines whether a transportation matching system application session associated with a requestor computing device will likely result in the generation of a transportation request. If it is likely, the transportation matching system includes the session in the dispatch exchange where the session can be matched to a provider in the same manner that other transportation requests are matched. This eliminates previous system resource waste by more accurately and efficiently allocating provider resources while minimizing requestor wait-times and enhancing the overall user experience associated with the transportation matching system. Accordingly, the present transportation matching system avoids the pitfalls and delays of conventional systems that fail to account for transportation requests that are likely to be generated in the near-future. The features disclosed herein further improve the processing speed and efficiency of the system by limiting unnecessary cancelations and by more efficiently spreading the processing tasks associated with matching transportation requests over time.

As used herein, a "transportation request" or "request" refers to a collection of data sent from a requestor computing device to a transportation matching system. In one or more embodiments, the transportation matching system, in turn, matches the request to at least one provider computing device (e.g., associated with a driver) that fulfills the transportation request. In one or more embodiments, a transportation request includes a pickup location, a destination location, and a transportation matching system user account identifier associated with the requestor computing device. In some embodiments, the transportation request can include GPS location associated with the requestor computing device, a pickup time (e.g., if the transportation request is scheduled for a future time), and other preferences associated with the requestor computing device (e.g., a music preferences, child seat preferences, accessibility preferences, provider rating preferences).

FIG. 1 illustrates an example environment 100 for the transportation matching system 102 including the requestor computing devices 118a, 118b, and 118c, and the provider computing devices 122a, 122b, and 122c. As shown, in one or more embodiments, the transportation matching system 102 can be implemented on one or more server(s) 104. As further shown in FIG. 1, the requestor computing devices 118a-118c and the provider computing devices 122a-122c communicate with the transportation matching system 102 via a network 116.

FIG. 1 illustrates that the transportation matching system 102 includes a session analyzer 106, a dispatch exchange 110, and a data storage 114. In one or more embodiments, the session analyzer 106 monitors and tracks session information along with other requestor and provider information in order to train and/or utilize the session model 108. For example, the session analyzer 106 stores this information in the data storage 114. In at least one embodiment, the session model 108 is a machine learning model that the session analyzer 106 trains to accurately determine a likelihood that a requestor computing device will generate a transportation request based on information associated with an active session. Furthermore, in at least one embodiment, the session model 108 is a mixed-model that also determines a time-to-request that represents an amount of time until the requestor computing device generates the likely transportation request.

Further shown in FIG. 1, the dispatch exchange 110 includes an optimization model 112. In one or more embodiments, when a determined likelihood for a requestor computing device is above a predetermined threshold, the transportation matching system 102 provides session information associated that requestor computing device to the dispatch exchange 110. The dispatch exchange 110 then weights the session information and provides the weighted session information to the optimization model 120. In at least one embodiment, the optimization model 112 receives a transportation request or session information and matches the transportation request or session information to a provider computing device. In response to the match made by the optimization model 112, the dispatch exchange 110 can reserve a matched provider computing device, generate a predicted dispatch, generate an actual dispatch, provide dispatch information to the requestor computing device associated with the transportation request or session information, and/or provide dispatch information to the matched provider computing device. The functionality of the optimization model 112 is discussed further below with reference to FIG. 4.

In one or more embodiments, the network 116 shown in FIG. 1 may include one or more networks and may use one or more communication platforms or technologies suitable for transmitting data and/or communication signals. In one or more embodiments, the network 116 includes a cellular network. Alternatively, the network 116 can include the Internet or World Wide Web. Additionally or alternatively, the network 116 can include various other types of networks that use various communication technologies and protocols, such as a corporate intranet, a virtual private network ("VPN"), a local area network ("LAN"), a wireless local network ("WLAN"), a wide area network ("WAN"), a metropolitan area network ("MAN"), or a combination of two or more such networks.

As further illustrated in FIG. 1, each of the requestor computing devices 118a-118c and the provider computing devices 122a-122c include the transportation matching system application 120a, 120b, 120c, 120d, 120e, and 120f, respectively. In one or more embodiments, the transportation matching system applications 120a-120f enable the users of the requestor computing devices 118a-118c (e.g., requestors) and the users of the provider computing devices 122a-122c (e.g., providers) to interact with features of the transportation matching system 102. For example, requestors can initiate transportation matching system application sessions, receive upfront dispatch information, configure and send transportation requests, and receive additional information from the transportation matching system via the transportation matching system applications 120a-120c. Providers can receive predicted dispatch information and standard dispatches, as well as fulfill transportation requests using the transportation matching system applications 120d-120f In at least one embodiment, the transportation matching system applications 120a-120c include features specific to requestors, while the transportation matching system applications 120d-120f include features specific to providers.

In at least one embodiment, one or more of the requestor computing devices 118a-118c generate a transportation request and send the generated transportation request to the transportation matching system 102. As discussed above, a "transportation request" refers to information provided by the transportation matching system applications 120a-120c and utilized by the transportation matching system 102 to match transportation requests to the provider computing devices 122a-122c. In one or more embodiments, the transportation matching system 102 receives a requestor-configured transportation request from the transportation matching system application 120a (e.g., a mobile application for requestors) installed on the requestor computing device 118a and utilizes the information provided in the transportation request to match the transportation request to the provider computing device 122a. For example, the transportation matching system 102 matches the requestor-configured transportation request to the provider computing device 122a based on: proximity of the provider computing device 122a to a specified pickup location, provider ratings and preferences, and the specified destination location.

Alternatively, as mentioned above, in response to detecting a session event associated with the transportation matching system application 120a, the transportation matching system 102 can determine a likelihood that the requestor computing device 118a will generate a transportation request. For example, in response to a detected session event, the transportation matching system application 120a can provide session information to the transportation matching system 102 for use as input into the trained session model 108. The transportation matching system 102 can then generate an upfront dispatch based on the likelihood determined by the session model 108. In one or more embodiments, as mentioned above, the transportation matching system 102 then provides threshold levels of dispatch information to the matched provider computing device and the requestor computing device 118a.

Figure 2A:
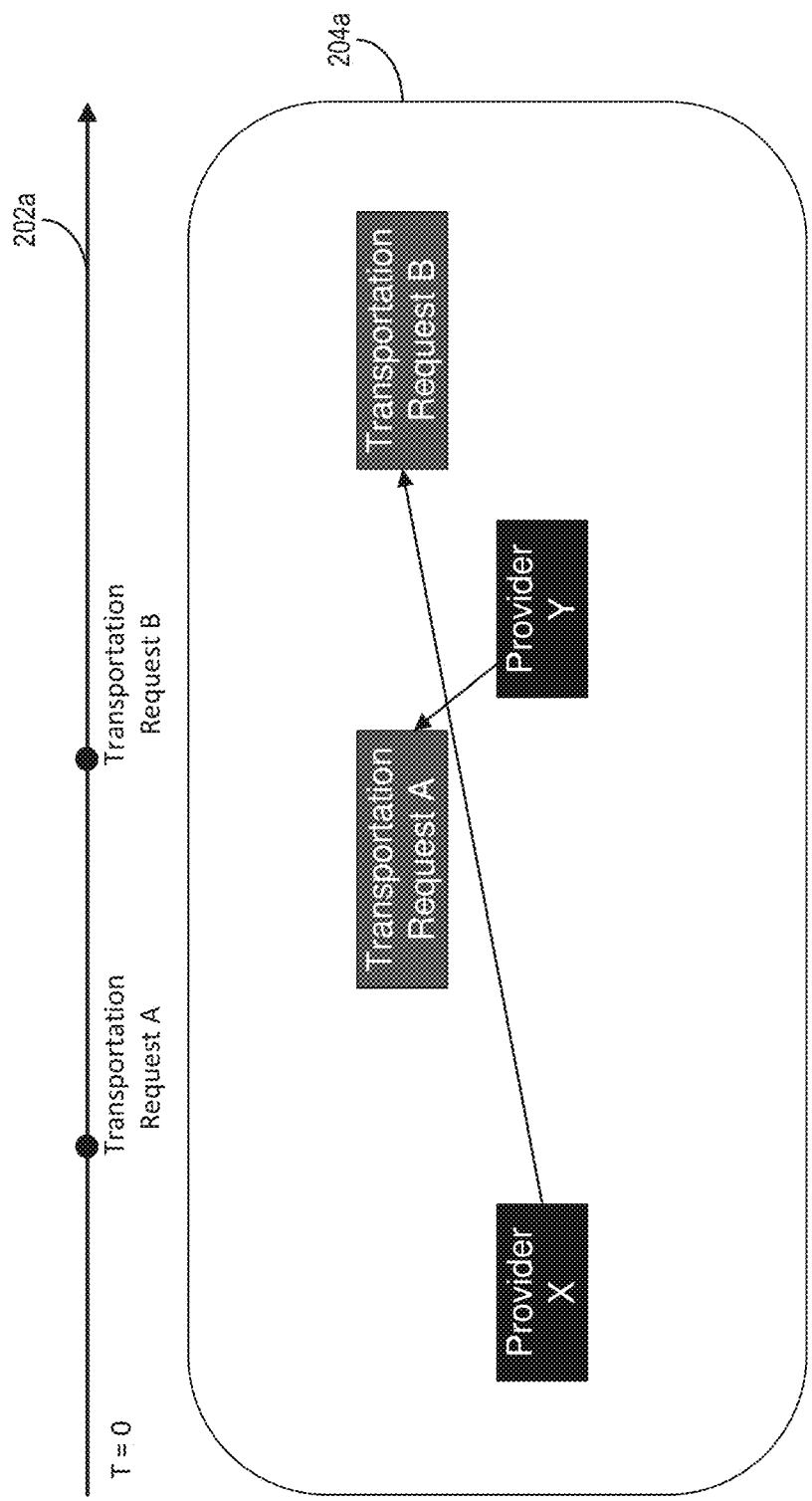
FIGS. 2A-2B illustrate diagrams of inefficient and efficient allocations of system resources based on current and future transportation requests in accordance with one or more embodiments.
Figure 2B:
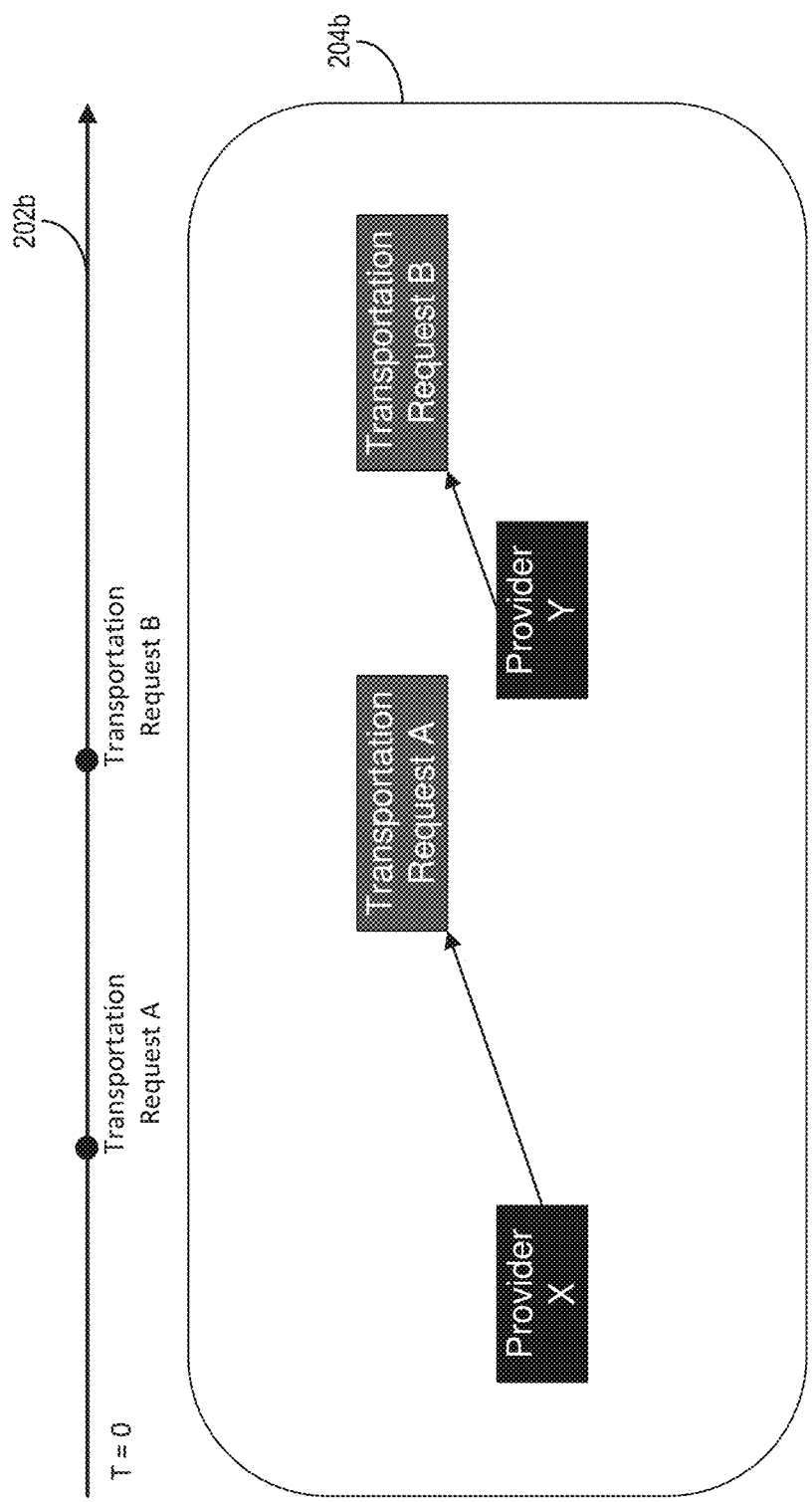

FIGS. 2A and 2B illustrate an example embodiment of the technical solution provided by the transportation matching system 102. For example, as shown in the timeline 202a in FIG. 2A, a conventional transportation matching system receives a transportation request "A" prior to receiving a transportation request "B." In response to receiving the transportation request "A" and prior to receiving the transportation request "B," the conventional transportation matching system matches the transportation request "A" to the nearest provider "Y" within the area 204a. However, when the conventional transportation matching system receives the transportation request "B," the only other provider "X" within the area 204a left to match to the transportation request "B" is much farther away from the transportation request "B." Thus, the conventional transportation matching system has inefficiently utilized system resources in failing to account for the fact that the transportation request "B" would likely be received in a short time.

The transportation matching system 102 addresses this inefficiency in FIG. 2B. For example as shown in the timeline 102b in FIG. 2B, the transportation matching system 102 receives a transportation request "A" prior to receiving a transportation request "B." The transportation matching system 102, concurrent with receiving the transportation request "A," also receives session information from a requestor computing device associated with the transportation request "B" in response to a session event. Accordingly, in a process described in greater detail below, the transportation matching system 102 accounts for the likelihood that the transportation request "B" will be generated when determining matches for both the received transportation request "A" and the future transportation request "B."

After taking the session information associated with the future transportation request "B" into account, the transportation matching system 102 more efficiently matches the transportation requests to providers within the area 204b. For example, as shown in FIG. 2B, in response to receiving session information, the transportation matching system 102 dispatches the provider "X" to the transportation request "A," and the provider "Y" to the transportation request "B." Thus, the transportation matching system 102 reduces wait time for both requestors associated with the transportation requests "A" and "B." Additionally, the transportation matching system 102 reduces drive time associated with the providers "X" and "Y." Thus, the transportation matching system 102 provides a faster and more efficient transportation solution.

Figure 3:
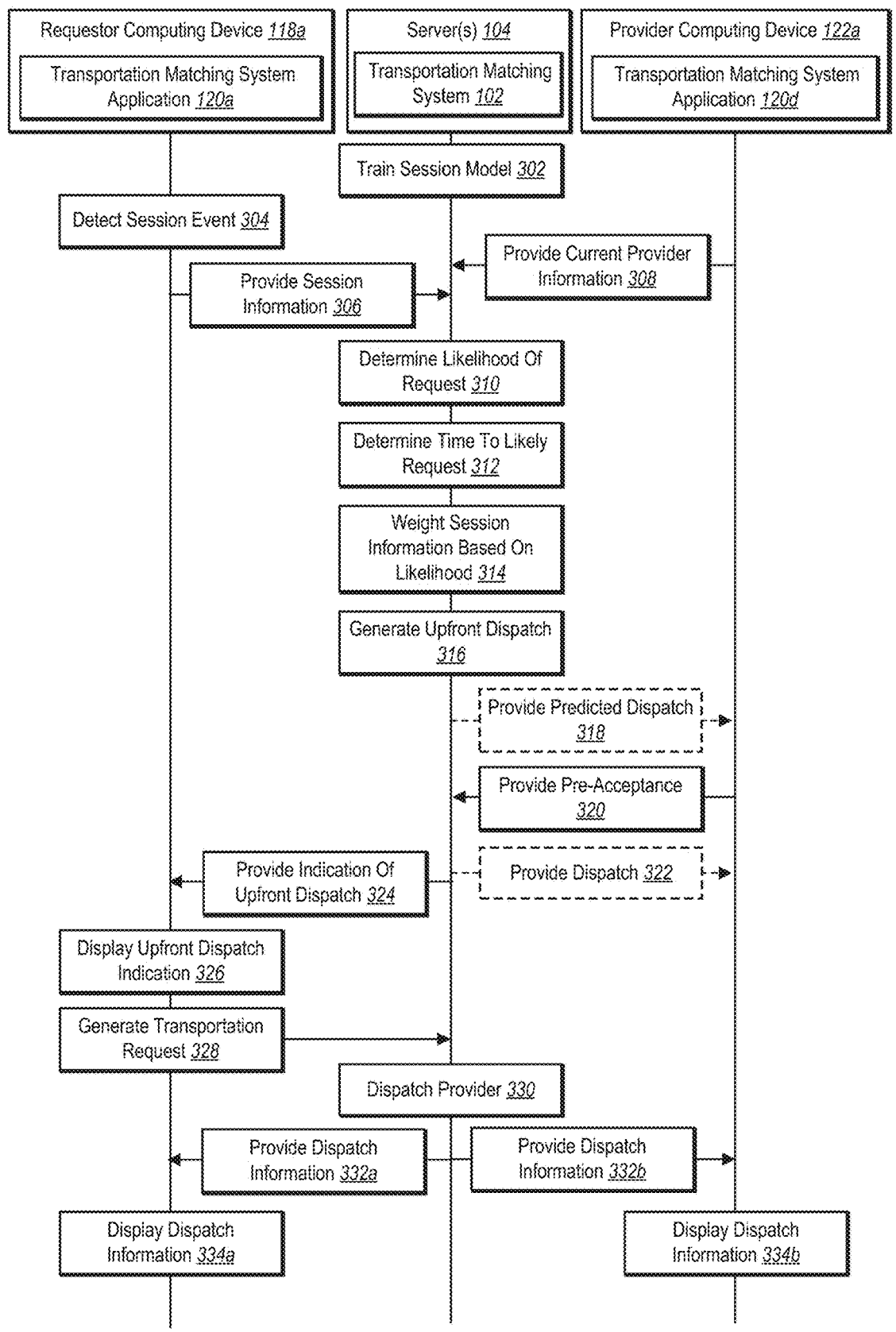
FIG. 3 illustrates a sequence diagram of a series of acts performed by the transportation matching system in generating an upfront dispatch in accordance with one or more embodiments.

FIG. 3 illustrates an example sequence of acts in accordance with the principles described herein. For instance, as mentioned above, the transportation matching system 102 determines a likelihood that the requestor computing device 118a will generate a transportation request and then generates an upfront dispatch based on that determination. FIG. 3 illustrates the sequence of acts by which the transportation matching system 102 generates the upfront dispatch and provides dispatch information to the requestor computing device 118a and the provider computing device 122a.

For example, the sequence of acts illustrated in FIG. 3 begins with the transportation matching system 102 training (302) the session model 108. As mentioned above, the session model 108 is a machine learning model trained to determine the likelihood that a session associated with a requestor computing device will lead to or result in the generation of a transportation request. For instance, the session model 108 can include, but is not limited to, support vector machines, linear regression, logistic regression, Bayesian networks, clustering, Kth-nearest neighbors, K-means, random forest learning, dimensionality reduction algorithms, boosting algorithms, artificial neural networks, deep learning, etc. In at least one embodiment, the session model 108 includes a Gamma-distribution and may in-turn contain the Exponential and Erlang distribution. Thus, the session model 108 makes high-level abstractions in data by generating data-driven predictions or decisions from the known input data.

In at least one embodiment, the session model 108 is a mixed-model capable of determining more than a likelihood related to a requestor computing device. For example, in one or more embodiments, the session model 108 determines a likelihood that a requestor computing device will generate a transportation request as well as a time-to-request. In one or more embodiments, the determined time-to-request indicates an amount of time that will likely pass before the likely transportation request is generated.

In one or more embodiments, the transportation matching system 102 trains (302) the session model 108 with historical information. For example, the transportation matching system 102 can monitor and store information from a cross-section of requestor computing devices (e.g., requestor computing devices within the same geographic area, requestor computing devices associated with requestors that share demographic traits) including, but not limited to, transportation requests, wait times, pickup locations, destination locations, transportation times, and session information (e.g., session events, session length prior to submitting a transportation request, average number of user interactions prior to submitting a transportation request, and whether the session results in a transportation request). In at least one embodiment, the transportation matching system 102 utilizes a feed-forward back-propagation methodology to train the session model 108 using historical information. In some embodiments, the transportation matching system 102 may periodically re-train the session model 108 in order to maintain predictive accuracy. The session model training process is described in greater detail below with reference to FIG. 6.

Following or concurrent with the transportation matching system 102 training (302) session model 108, the transportation matching system application 120a installed on the requestor computing device 118a detects a session event (304). In one or more embodiments, as mentioned above, session events include, but are not limited to, an application open event, a set pickup event, a set destination event, a change ride type event, an undo event, a select payment event, and an application close event. For example, the transportation matching system application 120a detects an application open event in response to a requestor engaging in a user interaction with the requestor computing device 118a that initializes the transportation matching system application 120a (e.g., tapping a home screen icon, switching display focus). The transportation matching system application 120a can detect a set pickup event in response to a user interaction in connection with one or more displays, interfaces, and graphical display elements that result in the selection or configuration of a pickup location within the transportation matching system application 120a. Additionally, the transportation matching system application 120a can detect a set destination event in response to a user interaction with one or more displays, interfaces, and graphical display elements that result in the selection or configuration of a destination location within the transportation matching system application 120a. The transportation matching system application 120a can detect a change ride type event in response to a user interaction with one or more displays, interfaces, and graphical display elements that result in a changed selection or re-configuration of a ride type within the transportation matching system application 120a. The transportation matching system application 120a can also detect any other change in a display or interface, such as a change to a preconfigured payment method. Furthermore, the transportation matching system application 120a can detect an application close event in response to a user interaction with the transportation matching system application 120a that causes the transportation matching system application 120a to close, thereby ending the current session (e.g., exiting the transportation matching system application 120a, switching display focus away from the transportation matching system application 120a). In a further embodiment, the transportation matching system application 120a can detect a backwards progression event, in which a user navigates back to a previous interaction, selection, or interface (e.g., to change a previously selected option). In additional or alternative embodiments, session events can include any type of action taken in connection with the transportation matching system application 120a. Additionally, session events can include events originating at the transportation matching system 102.

In response to detecting a session event (304) relative to a session in the requestor computing device 118a, the transportation matching system application 120a provides session information (306) to the transportation matching system 102. For example, the transportation matching system application 120a can provide information associated with the current session including a current timestamp associated with the requestor computing device 118a, a current location of the requestor computing device 118a (e.g., a GPS location, a WiFi-based location), a recently detected session event, one or more previously detected session events, and a current session length (e.g., an amount of time that has elapsed since the transportation matching system application session began).

At any time pre-match, the transportation matching system application 120d installed on the provider computing device 122a provides current provider information (308) to the transportation matching system 102. For example, current provider activity information can include information that the transportation matching system 102 utilizes in matching a session or transportation request to the provider computing device 122a. Thus, current provider activity information can include, but is not limited to, a current location of the provider computing device 122a, the current availability of the provider computing device 122a, the preferred transportation radius of the provider computing device 122a, the service schedule of the provider computing device 122a, etc. In one or more embodiments, the transportation matching system 102 regularly receives current provider activity information from all currently active provider computing devices.

In response to receiving session information (306) from the requestor computing device 118a, the transportation matching system 102 determines a likelihood (310) that the requestor computing device 118a will generate a transportation request. For example, in one or more embodiments, the transportation matching system 102 first generates an input vector based on the received session information, and then provides the generated input vector to the trained session model 108. As described above, the trained session model 108 utilizes machine learning in connection with the generated input vector to determine a likelihood that the requestor computing device 118a will generate a transportation request. Additionally, as described above, in some embodiments, the session model 108 is a mixed model that also determines a time to the likely request (312). For example, in response to receiving the generated input vector including the provided session information, the session model 108 can determine that there is an 80% likelihood that the requestor computing device 118a will submit a transportation request in the next 120 seconds.

In response to determining that the likelihood provided by the session model 108 is above a predetermined threshold (e.g., above 60% likely that the requestor computing device 106a will generate a transportation request), the transportation matching system 102 can submit the session information to the dispatch exchange. For example, in some embodiments, the transportation matching system 102 weights the session information based on the determined likelihood (314). For example, in order to account for the difference between sessions and already-received transportation requests in the optimization model 112, the transportation matching system 102 weights (e.g., discounts) session information prior to providing the session information to the optimization model 112, or provides information for the optimization model 112 to weight the session accordingly within the dispatch exchange. In at least one embodiment, the transportation matching system 102 weights the session information such that the weight corresponds to the determined likelihood. For example, if the determined likelihood is 65%, the transportation matching system 102 can weight the associated session information lighter than the session information associated with a determined likelihood of 85%.

The process by which the transportation matching system 102 weights session information is described further below with reference to FIG. 4.

After weighting the session information (314), the transportation matching system 102 generates an upfront dispatch (316). As described above, an "upfront dispatch" refers to a match made between a provider computing device and a session currently active on a requestor computing device. Additionally, the upfront dispatch can include reserving a matched provider computing device for a period of time. In one or more embodiments, the transportation matching system 102 generates an upfront dispatch (316) by sending the weighted session information to the dispatch exchange 110.

In one or more embodiments, the optimization model 112 matches the weighted session information to the provider computing device 122a. For example, as will be described in greater detail below with reference to FIG. 4, the optimization model 112 monitors a pool of available provider computing devices and matches a received transportation request to one of the provider computing devices in the pool. In at least one embodiment, the optimization model 112 matches transportation requests received from requestor computing devices and weighted sessions received from the transportation matching system 102 based, at least in part, on the cost or weight associated with each request or session.

In response to receiving a match for the session from the optimization model 112, the transportation matching system 102 reserves the matched provider computing device 122a for a period of time. For example, in order to prevent the optimization model 112 from matching the provider computing device 122a to another transportation request or session, the transportation matching system 102 can remove the provider computing device 122a from the pool of available provider computing devices. The transportation matching system 102 can reserve the provider computing device 122a for a predetermined amount of time (e.g., 10 seconds), or can reserve the provider computing device 122a until the likely transportation request is received from the requestor computing device 118a.

Additionally, in response to receiving a match for the session from the optimization model 112, the transportation matching system 102 provides varying levels of dispatch information to the provider computing device 122a depending on the likelihood of request determined by the session model 108. For example, in response to the determined likelihood that the requestor computing device 118a will generate a transportation request corresponding with a first threshold (e.g., 60%-80% likely), the transportation matching system 102 provides a predicted dispatch (318) to the provider computing device 122a.

In one or more embodiments, the transportation matching system 102 provides information in a predicted dispatch that indicates an area (e.g., a city block, a street, a landmark) where the provider computing device 122a should be in order to provide future transportation, and a statement regarding the possibility of a future transportation request (e.g., "A request will be coming from this area soon"). For example, the area indicated by the predicted dispatch corresponds with an area where the requestor computing device 118a is currently located (e.g., included in the provided session information (306)). In at least one embodiment, the predicted dispatch (318) also includes an incentive offer or bonus to further motivate the provider associated with the provider computing device 122a to travel to area where the requestor computing device 118a is located. In one or more embodiments, the predicted dispatch (318) does not include information specifically identifying the requestor computing device 118a, thus making it clear to the provider computing device 122a that the match is not yet final.

In one or more embodiments, the transportation matching system 102 gives the provider computing device 122a the opportunity to pre-accept a predicted dispatch (318). For example, in response to the transportation matching system application 120d installed on the provider computing device 122a providing a pre-acceptance (320) associated with the predicted dispatch (318), the transportation matching system 102 can automatically dispatch the provider computing device 122a to the requestor computing device 118a when the transportation request associated with the predicted dispatch (318) is eventually received by the transportation matching system 102. In that embodiment, the transportation matching system 102 can update one or more portions of a GUI on the provider computing device 122a to indicate that the predicted dispatch is now an official dispatch.

Additionally or alternatively, in response to the determined likelihood that the requestor computing device 118a will generate a transportation request corresponding with a second threshold (e.g., above 80% likely), the transportation matching system 102 provides a dispatch (322) to the provider computing device 122a. For example, in response to determining the likelihood corresponds with the second threshold, the transportation matching system 102 utilizes the upfront dispatch (316) in the same manner that a transportation request initiated match from the optimization model 112 is utilized. In one or more embodiments, the provided dispatch (322) includes identifying information associated with the requestor computing device 118a and lists the current location or selected pickup location of the requestor computing device 118a as a pickup location. In at least one embodiment, the transportation matching system 102 can analyze an activity history associated with the requestor computing device 118a to provide a likely destination location as part of the provided dispatch (322). Thus, if the likelihood that the requestor computing device 118a will generate a transportation request is high enough, the transportation matching system 102 masks the fact that the transportation request hasn't been received from the provider computing device 122a. In other words, in at least one embodiment, the provider associated with the provider computing device 122a cannot see a difference between a dispatch based on a requestor-initiated transportation request, and a dispatch based on session information.

In one or more embodiments, the transportation matching system 102 provides the predicted dispatch (318) or the dispatch (322) to the provider computing device 122a according to the likely time-to-request (312) determined by the session model 108. For example, the transportation matching system 102 may only provide the predicted dispatch (318) if the determined time-to-request (312) is more than the amount of time it will take the provider computing device 122a to travel to the area associated with the predicted dispatch (318). To illustrate, the transportation matching system 102 may only provide the predicted dispatch (318) in response to determining that it will take the provider computing device 122a 60 seconds to travel to the area associated with the predicted dispatch (318) and the determined time-to-request (312) is 75 seconds.

Similarly, the transportation matching system 102 may only provide the dispatch (322) to the provider computing device 122a in response to determining that the likely time-to-request (312) is within a threshold amount of time. To illustrate, the transportation matching system 102 may only provide the dispatch (322) to the provider computing device 122a when the requestor computing device 118a is likely to generate a transportation request within the next 10 seconds. In one or more embodiments, the transportation matching system 102 only provides session-based dispatches to provider computing devices when a very likely transportation request is expected to be generated in a short amount of time in order to reduce the chances that a provider computing device will be mistakenly or incorrectly dispatched.

In one or more embodiments, the transportation matching system 102 provides an indication of the upfront dispatch (324) to the requestor computing device 118a. For example, the transportation matching system 102 can provide an indication of the upfront dispatch (324) that includes identifying information associated with the provider computing device 122a (e.g., a provider's name associated with the provider computing device 122a, a provider rating associated with the provider computing device 122a, languages spoken by the provider associated with the provider computing device 122a), a current location of the provider computing device 122a, and a route the provider computing device 122a may be traveling on toward the requestor computing device 118a (e.g., if the provider computing device 122a has been pre-dispatched). In one or more embodiments, the transportation matching system application 120a updates one or more displays to include the upfront dispatch indication (326).

In at least one embodiment, the transportation matching system 102 can provide the indication of the upfront dispatch in response to determining that the likely time-to-request (312) is within a threshold amount of time. For example, the transportation matching system 102 may only provide the indication of the upfront dispatch if the likely time-to-request (312) is within the next 15 seconds. Accordingly, in one or more embodiments, the transportation matching system 102 only provides information that identifies a provider to a requestor computing device when it is highly likely that the requestor computing device is going to generate a transportation request.

In one or more embodiments, the transportation matching system application 120a generates a transportation request (328) on the requestor computing device 118a. For example, as discussed above, the transportation matching system application 120a generates the transportation request to include information such as identifying information, a pickup location, a destination location, and user preferences. In at least one embodiment, the generated transportation request (328) is the same transportation request that the session model 108 determined was likely (310).

In response to the generated transportation request (328), the transportation matching system 102 dispatches (330) the provider computing device 122a. As discussed above, if the provider computing device 122a provided a pre-acceptance (320) associated with a predicted dispatch (318), the transportation matching system 102 does not send the generated transportation request (328) to the dispatch exchange 110 for matching, but rather automatically dispatches the provider computing device 122a to the requestor computing device 118a. Similarly, if the provider computing device 122a is already traveling toward the requestor computing device 118a in response to a provided dispatch (322), the transportation matching system 102 automatically dispatches the provider computing device 122a to the requestor computing device 118a. After automatically dispatching the provider computing device 122a, the transportation matching system 102 removes the provider computing device 122a from reserve status within the pool of provider computing devices utilized by the optimization model 112.

The transportation matching system 102 then provides dispatch information (332a, 332b) to the requestor computing device 118a, and the provider computing device 122a, respectively. It follows that the requestor computing device 118a and the provider computing device 122a then display the dispatch information (334a, 334b). For example, the dispatch information can include identifying information, a proposed route to the pickup location, an estimated cost associated with transport to a destination location, and other preferences and ratings. In one or more embodiments, the transportation matching system 102 can periodically update the provided dispatch information (332a) such that the requestor can view an exact location of the provider computing device 122a as the provider computing device 122a travels to the pickup location.

At any point prior to dispatching the provider (330), the transportation matching system 102 may detect an additional session event associated with the requestor computing device 118a. For example, if the originally detected session event is an application open event, the transportation matching system 102 may detect a set pickup location event shortly thereafter. In response to the newly detected session event, the transportation matching system 102 generates an updated likelihood and/or upfront dispatch. The transportation matching system 102 can repeat this process any number of times in response to detected session events relative to the same session on the requestor computing device 118a.

For example, in order to generate an updated upfront dispatch, the transportation matching system 102 repeats the steps or acts 306-316 with updated session information (306) from the requestor computing device 118a. Based on this updated session information, the transportation matching system utilizes the session model 108 to determine an updated likelihood that the session on the requestor computing device 118a will result in a transportation request. If the resulting updated determination is still above the predetermined threshold, the transportation matching system 102 can maintain a previously provided dispatch (322). Additionally, if the resulting updated determination is still above the predetermined threshold, the transportation matching system 102 can upgrade a previously provided predicted dispatch (318) to a dispatch (322).

If the resulting updated determination falls below the predetermined threshold, the transportation matching system 102 cancels the upfront dispatch. For example, the transportation matching system 102 can cancel the upfront dispatch by removing the reserve status of the provider computing device 122a within the pool of provider computing devices. Additionally, the transportation matching system 102 can provide updated indicators to the provider computing device 122a informing the provider that the pickup opportunity associated with the predicted dispatch or dispatch is no longer available. If the transportation matching system 102 previously provided an indication of the upfront dispatch to the requestor computing device 118a, the transportation matching system 102 can update this indication to inform the requestor that the previously identified provider is no longer available.

Figure 4:
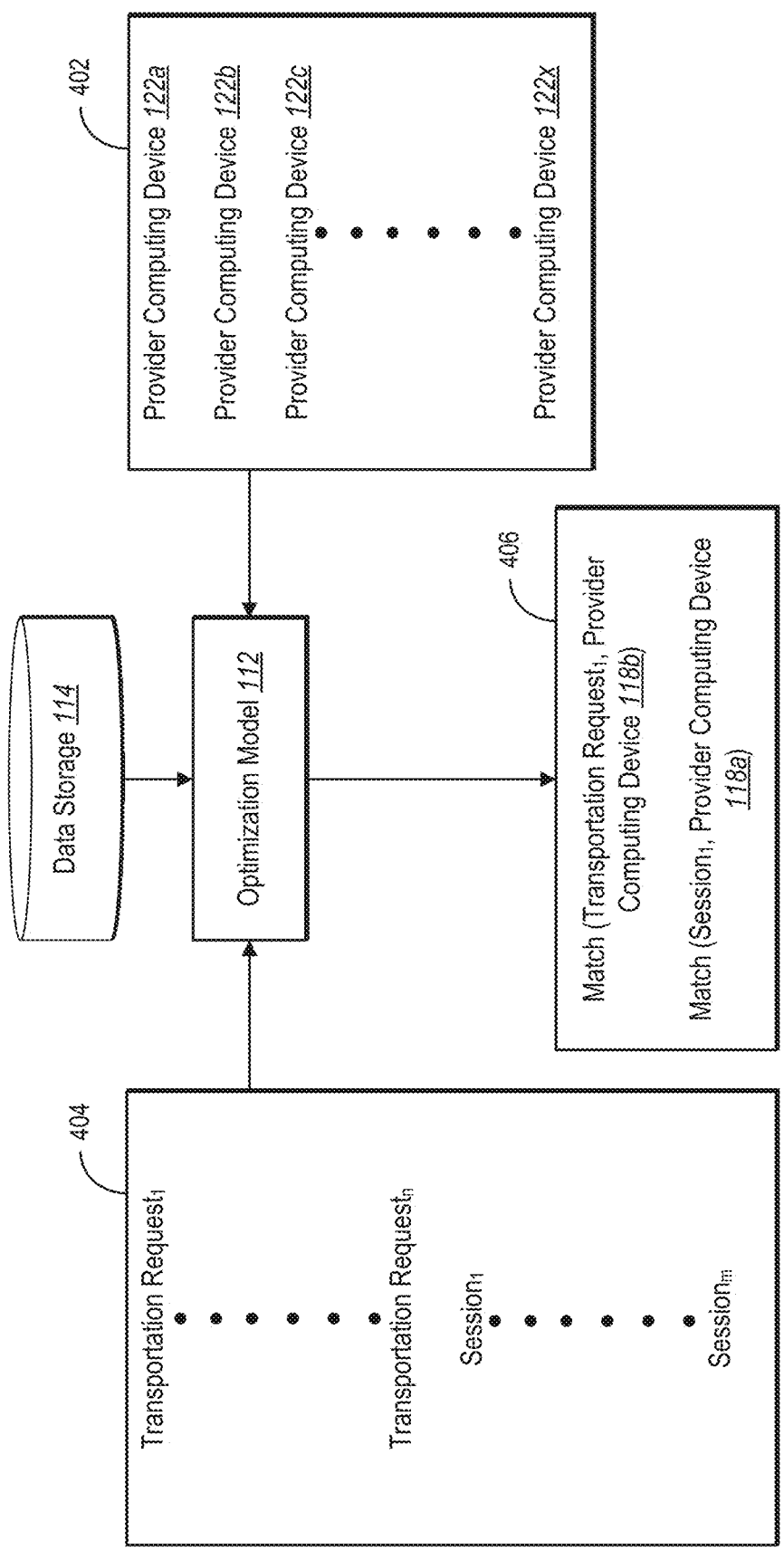
FIG. 4 illustrates a schematic of an optimization model matching provider computing devices to received transportation requests and sessions in accordance with one or more embodiments.

FIG. 4 illustrates a schematic of the optimization model 112 of the dispatch exchange as it performs the matching process. As mentioned above, the optimization model 112 matches transportation requests and session information to provider computing devices. In one or more embodiments, the transportation matching system 102 utilizes these matches to generate upfront dispatches and to provide predicted dispatches and dispatch information for provider computing devices and requestor computing devices, respectively. The process by which the optimization model 112 matches transportation requests and session information to provider computing devices is illustrated in FIG. 4. For example, as shown in FIG. 4, the transportation matching system 102 supports the optimization model 112, which in turn, accesses a provider pool 402 and a collection 404 of transportation requests and sessions, and outputs a listing 406 of matches.

As mentioned above, in one or more embodiments, the optimization model 112 is a machine learning model trained to match transportation requests and sessions to provider computing devices. In at least one embodiment, the optimization model 112 makes a match between a transportation request or session and a provider computing device by minimizing one or more functions related to request or session and the provider computing device. In one or more embodiments, the optimization model 112 can include, but is not limited to, support vector machines, linear regression, logistic regression, Bayesian networks, clustering, Kth-nearest neighbors, K-means, random forest learning, dimensionality reduction algorithms, boosting algorithms, artificial neural networks, and/or deep learning.

In one or more embodiments, the transportation matching system 102 provides the optimization model 112 with access to the data storage 114 (e.g., shown in FIG. 1) for training and determination purposes. For example, while the optimization model 112 primarily generates matches based on distance and estimated time of arrival, the optimization model 112 can take additional information into account while generating a match. In at least one embodiment, the optimization model 112 utilizes the data storage 114 to access requestor and provider activity history, preferences, and ratings.

In one or more embodiments, the transportation matching system 102 monitors provider activity in order to identify one or more provider computing devices that are not currently dispatched and can be included in the provider pool 402. For example, the transportation matching system 102 considers a provider computing device to be currently dispatched when the provider computing device has provided an acceptance of a dispatch (e.g., a match between the provider computing device and a transportation request), has confirmed a requestor pickup, or is currently providing transport to a destination location). In at least one embodiment, the transportation matching system 102 adds every provider computing device 122a-122x to the provider pool 402 that is not currently dispatched or unavailable to receive transportation requests.

In one or more embodiments, one or more of the provider computing devices 122a-122x may be reserved. For example, as will be described in greater detail below, in response to the optimization model 112 matching a session to the provider computing device 122a, the transportation matching system 102 may only provide a predicted dispatch to the provider computing device 122a. Accordingly, the transportation matching system 102 will not recognize the provider computing device 122a as officially dispatched, but may instead assign the provider computing device 122a a reserved status. In at least one embodiment, provider computing devices with a reserved status are not removed from the provider pool 402, but are not available to the optimization model 122 for matching.

As discussed above, the collection 404 includes requestor-initiated transportation requests, as well as transportation matching system 102 sessions (e.g., collections of session information each associated with a particular session). In one or more embodiments, a transportation request includes a pickup location and a destination location. Accordingly, when identifying a match for a transportation request, the optimization model 112 optimizes the ETA (e.g., "estimated time of arrival") between the provider computing devices in the provider pool 402 and the requestor computing device associated with the transportation request. Thus, for example, the optimization model 112 generates the match between "Transportation Request$_1$" and provider computing device 118b in response to determining that the provider computing device 118b has the best ETA relative to the pickup location specified in the Transportation Request$_1$.

In order to generate upfront dispatches, the transportation matching system 102 also includes sessions or session information in the collection 404. For example, in the collection 404, a session includes the likelihood determination that the requestor computing device associated with the session will generate a transportation request (e.g., determined by the session model 108), the time-to-request determination (e.g., determined by the session model 108), and a weight or discounted cost assigned by the transportation matching system 102 assigned to the session.

For example, the transportation matching system 102 calculates the discounted cost for the session by applying the following function:

$$\max_m \sum_{i=1}^{N} e^{-\lambda \tau_i} \rho_{i,m(i)}^{sess \to ride}$$

Where $\rho_i$ is the likelihood that the session will result in a request, $\tau_i$ is the mean time-to-request, and $\lambda$ is the exponential discount rate. To illustrate, in order to determine the discounted cost of an ETA, the transportation matching system 102 multiplies the ETA by a value smaller than one (e.g., 0.5) and adds a constant amount of time (e.g., 600 seconds or 10 minutes). The resulting ETA would equal (0.5)*ETA+600.

In order to identify matches for sessions included in the collection 404, the optimization model 112 performs a discounted optimization based on the determined time-to-request. In one or more embodiments, the discounted optimization is represented as:

$$\text{Minimize}(p_i \Sigma e^{-\lambda \tau_i} ETA_{i,j} + \gamma_i)$$

Where $p_i$ is the likelihood determination determined by the session model 108 (e.g., $0 < p_i < 1$), $\tau_i$ is the time-to-request, and $\gamma_i$ depends on the likelihood determination and is a monotonic decreasing function. In at least one embodiment, the transportation matching system 102 further improves the optimization model 112 by modifying the weight or "discount cost" to:

$$e^{-\lambda \tau_i} => \int_{t_1}^{\infty} e^{-\lambda t} \Gamma'(t) dt$$

Thus, for example, in response to minimizing the function above, the optimization model 112 matches "Session$_1$" with provider computing device 118a (e.g., as shown in the listing 406 of matches) at least in part because "Session$_1$" is associated with a high likelihood of resulting in a generated transportation request. In one or more embodiments, the transportation matching system 102 adds a constant to every session in the optimization model 112 such that the constant "chooses" which session is matched. In that embodiment, the multiplier is the weight a session has in the matching. For example, if the weight is low, the transportation matching system 102 focuses on other transportation requests in the optimization model 112.

The optimization model 112 can perform the matching process based on a threshold amount of time elapsing (e.g., every 5 seconds). Alternatively or additionally, the optimization model 112 can perform the matching process when the number of transportation requests and/or session in the collection 404 surpasses a threshold number.

Figure 5:
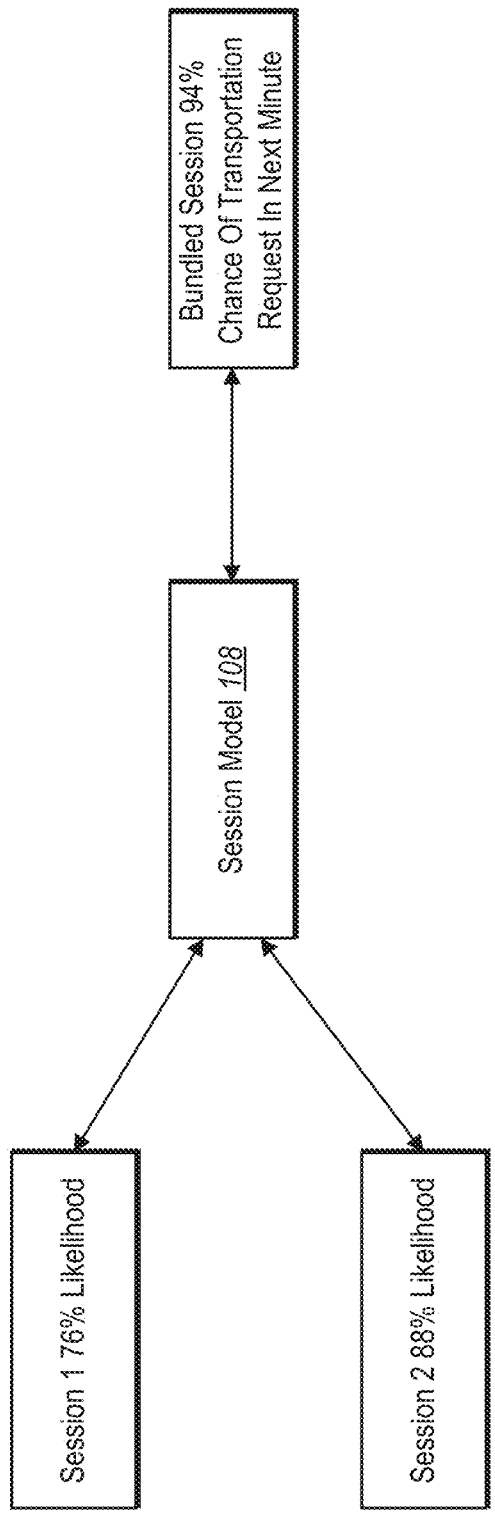
FIG. 5 illustrates a process diagram of a session model utilizing bundled session information in accordance with one or more embodiments.

FIG. 5 illustrates the process by which the transportation matching system 102 bundles sessions. In one or more embodiments, the session analyzer 106 of the transportation matching system 102 bundles sessions together in order to more efficiently utilize system resources within the transportation matching system 102. For example, requestor computing devices within a constrained geographic area may simultaneously engage in transportation matching system session events. In order to ensure there are adequate provider resources located within the geographic area, the session analyzer 106 treats multiple detected sessions as a single session by bundling the session information together.

As shown in FIG. 5, the transportation matching system 102 may utilize the session model 108 to determine that "Session 1" has a 76% likelihood of resulting in a transportation request, and that "Session 2" has an 88% likelihood of resulting in a transportation request. In response to determining that the requestor computing devices associated with "Session 1" and "Session 2" are within the same geographically constrained area (e.g., the same neighborhood, within a threshold distance of the same address or landmark, on the same street, in the same building), the transportation matching system 102 can bundle together the session information associated with "Session 1" and with "Session 2." For example, the bundling process can include adding all the session events detected in connection with the requestor computing devices associated with "Session 1" and "Session 2" to a single collection of session information.

In one or more embodiments, the transportation matching system 102 provides the bundled session information to the session model 108, where the session model 108 makes a likelihood determination based on the bundled session information in the same manner as for non-bundled session information. For example, the session model 108 analyzes the bundled session information to determine the likelihood that a transportation request will be generated in association with the at least one of the sessions represented in the bundled session information. In at least one embodiment, as shown in FIG. 5, bundling session information together can result in a higher overall likelihood that a transportation request will be generated in association with the geographic area where the bundled sessions originated.

In the same manner described above with reference to FIG. 3, the transportation matching system 102 can generate an upfront dispatch depending on whether the determined likelihood based on the bundled session information meets or exceeds predetermined thresholds. In at least one embodiment, the transportation matching system 102 may only provide predicted dispatches to the geographically constrained area associated with bundled session information. In at least on embodiment, this is because an upfront dispatch based on bundled sessions is not associated with a single requestor computing device. Thus, the transportation matching system 102 would have no single pickup location to identify in a provider dispatch.

Figure 6:
FIG. 6 illustrates a process diagram of the transportation matching system applying a training process to the session model in accordance with one or more embodiments.

FIG. 6 illustrates the process by which the session analyzer 106 of the transportation matching system 102 trains the session model 108. As mentioned above, the session analyzer 106 trains the session model 108 to accurately determine the likelihood that a session associated with a transportation matching system application on a requestor computing device will result in a transportation request. In one or more embodiments, the session analyzer 106 accesses the data storage 114 in order to train the session model 108 with historic and current information.

For example, session analyzer 106 accesses event information, ride states information, requestor states information, and aggregate information within the data storage 114 in order to train the session model 108. In at least one embodiment, the session analyzer 106 accesses event information including, but not limited to, requestor metadata (e.g., phone version, transportation matching system application version, cellular provider, signal strength, location, time, operating system version), previous page view, previously detected session events, moving pickup location, set destination location, added waypoints, scheduled ride selection, whether the transportation matching system application is in the background, how the transportation matching system application was open on the requestor computing device, and battery level.

Additionally, the session analyzer 106 accesses ride states information including, but not limited to, whether the requestor has paid an out of pocket fare, an estimated time of arrival, an estimated time of departure, the speed and/or expense of a route, and the distance of the requested transportation. Furthermore, the session analyzer 106 accesses requestor states information including, but not limited to, a number of credits a requestor currently has in balance, any coupons the requestor possesses within his account, a fraud/risk score associated with the requestor, stored credit card information associated with the requestor, and other identifying information (e.g., a photograph, address) associated with the requestor.

The session analyzer 106 also accesses aggregate information. For example, the session analyzer 106 accesses medium-term aggregate information including, but not limited to, a number of sessions associated with a requestor computing device in a previous threshold amount of time, a number of requests received from the requestor computing device in the previous threshold amount of time, a number of predicted convergences associated with the requestor computing device in the previous threshold amount of time, number and types of user interactions received in connection with GUIs and other graphical display elements provided by the transportation matching system application on the requestor computing device in the previous threshold amount of time, and a number of completed requests associated with the requestor computing device in the previous threshold amount of time. In one or more embodiments, the previous threshold amount of time can be a previous twenty-four hour time period, a previous week, a previous month, and so forth. In one or more embodiments, the session analyzer 106 also accesses long-term aggregate information including, but not limited to, a total number of sessions associated with the requestor computing device, a total number of requests received from the requestor computing device, a total number of predicted convergences associated with the requestor computing device, and a total number of completed requests associated with the requestor computing device.

In one or more embodiments, the session analyzer 106 utilizes the accessed information described above to train the session model 108 to accurately determine a likelihood that a session will result in a transportation request. For example, in at least one embodiment, the session analyzer 106 utilizes a feed-forward back-propagation methodology to train the session model 108 with the accessed information. In additional or alternative embodiment, the session analyzer 106 utilizes other methodologies (e.g., gradient boosted trees) to train the session model 108 with the accessed information. As mentioned above, in some embodiments, the transportation matching system 102 may periodically (e.g., once a week, after every predetermined number of determinations) re-train the session model 108 in order to maintain predictive accuracy.

Figure 7B:
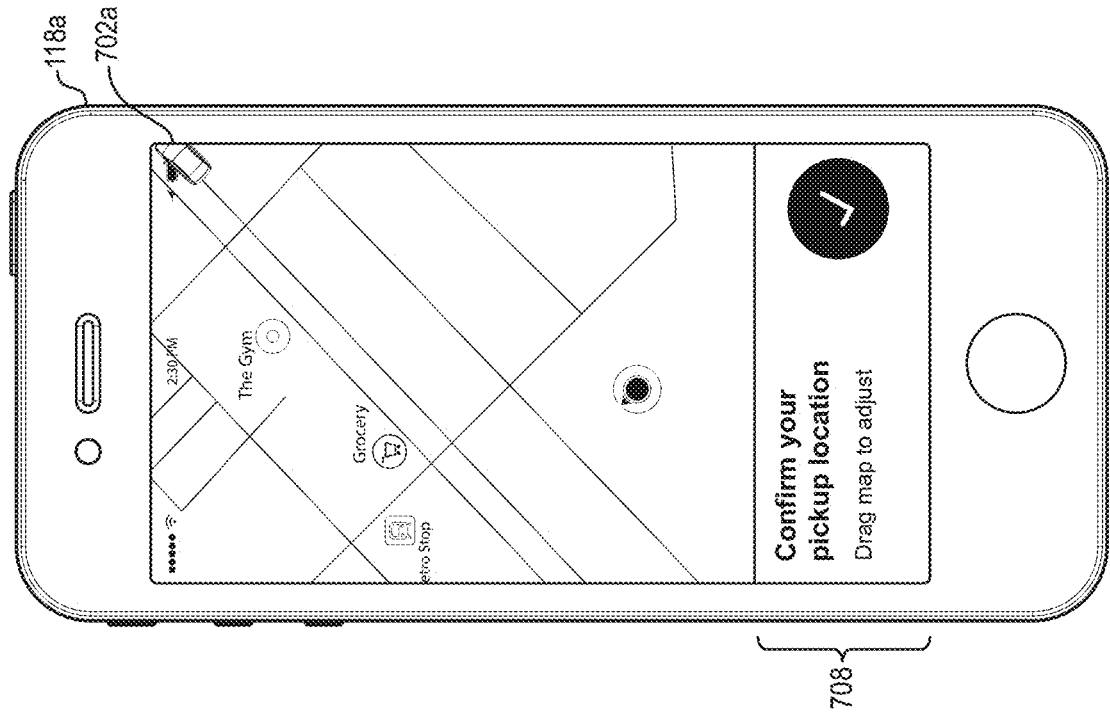
FIGS. 7A-7E illustrate a series of graphical user interfaces that the transportation matching system provides to one or more requestor computing devices and/or provider computing devices in accordance with one or more embodiments.
Figure 7A:
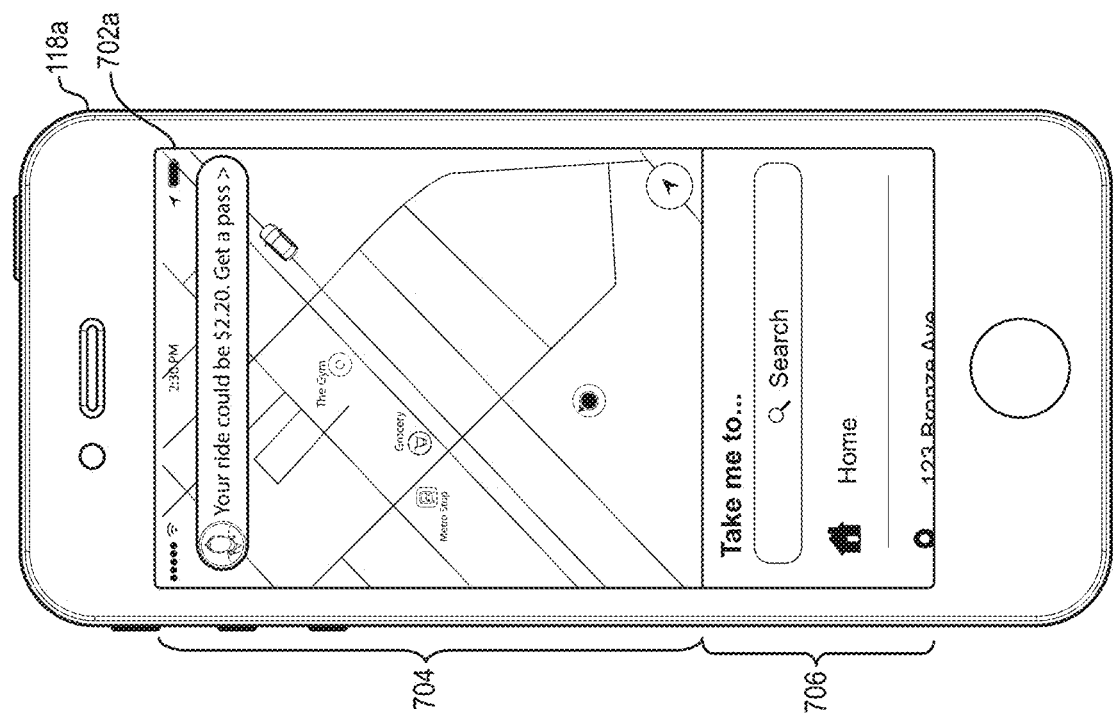
Figure 7D:
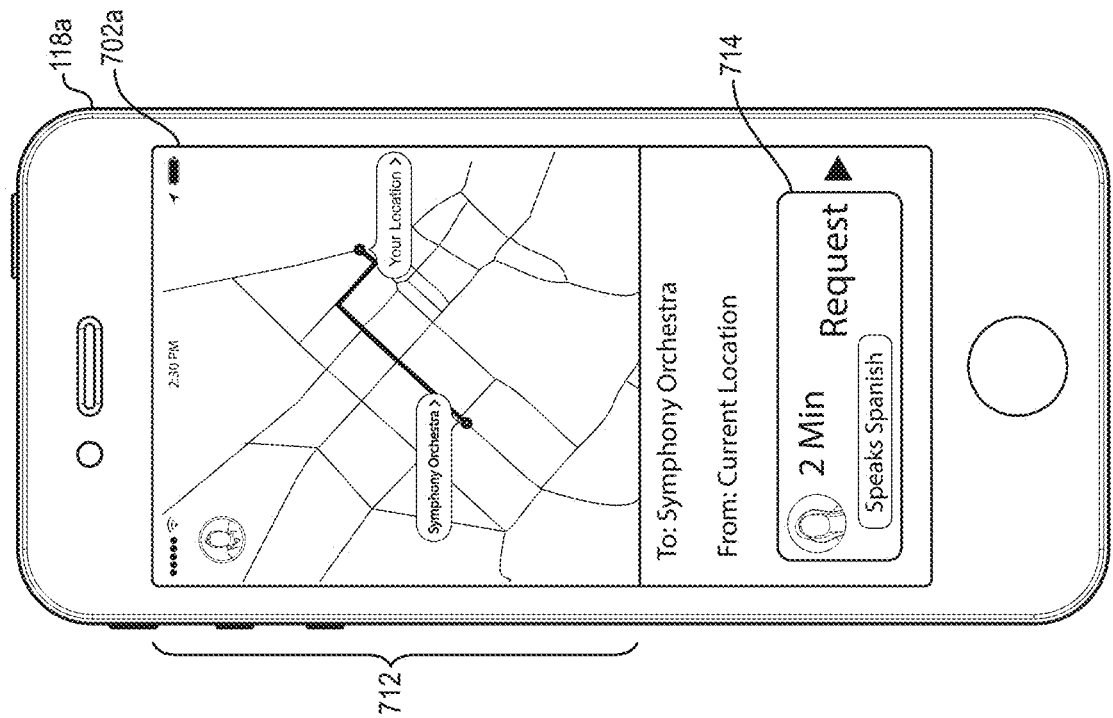
Figure 7C:
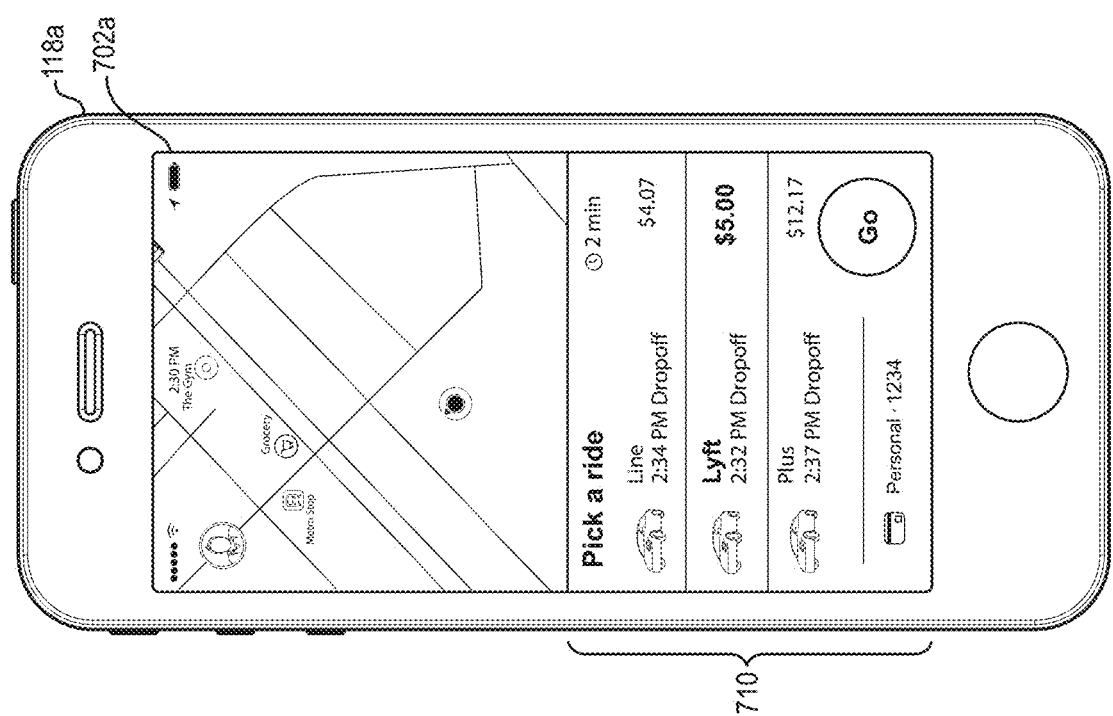
Figure 7E:
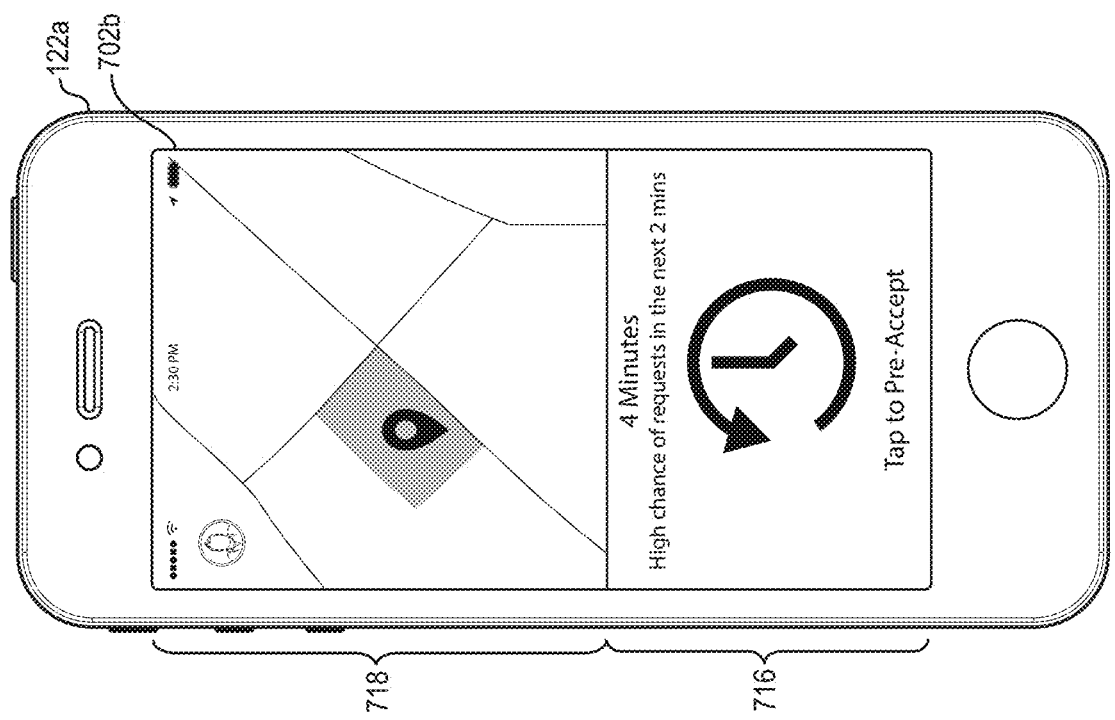

As mentioned above, the transportation matching system 102 (e.g., via the transportation matching system application 120a on the requestor computing device 118a) detects session events and determines, based on the detected session events, the likelihood that a session on the requestor computing device 118a will result in a transportation request. Furthermore, the transportation matching system 102 provides indications of a generated upfront dispatch to the requestor computing device 118a and at least one provider computing device based on the determined likelihood. FIGS. 7A-7C illustrate various session events in connection with the transportation matching system application 120a. FIGS. 7D-7E illustrate one or more indications of the generated upfront dispatch.

For example, as shown in FIG. 7A, the transportation matching system 102 (via the transportation matching system application 120a) provides an interactive map 702 in a portion of a touch screen display 702a on the requestor computing device 118a. Additionally, the transportation matching system 102 provides an area 706 including various controls whereby a requestor can configure a destination location. For example, the area 706 can include a text input box and one or more suggested destination location controls. Utilizing these or other controls, a requestor can configure a destination location for inclusion in a transportation request.

In one or more embodiments, in response to a detected configuration of a destination location via the interactive map 702 and/or the area 706, the transportation matching system application 120a detects a session event. As discussed above, in response to detecting this session event, the transportation matching system application 120a provides session information to the transportation matching system 102. The transportation matching system 102 utilizes the session model 108 to determine a likelihood that the transportation matching system application session where the requestor (e.g., user of the requestor computing device 118a) just configured a destination location will result in a transportation request.

As mentioned above, a typical event flow associated with the transportation matching system application 120a on the requestor computing device 118a can next include confirmation of a pickup location. For example, as shown in FIG. 7B, in response to the configuration of the destination location (e.g., as shown in FIG. 7A), the transportation matching system application 120a can update a portion of the touch screen display 702 to include a pickup location confirmation control 708. In response to a detected user interaction with the pickup location confirmation control 708, the transportation matching system application 120a also detects another session event. In response to the newly detected session event, the transportation matching system application 120a provides updated session information to the transportation matching system 102. The transportation matching system 102 then utilizes the session model 108 to determine an updated likelihood that the session on the requestor computing device 118a will result in a transportation request. If the transportation matching system 102 previously generated an upfront dispatch, the transportation matching system 102 may update the upfront dispatch based on the updated likelihood.

Next, as shown in FIG. 7C, in response to receiving a confirmation of the pickup location, the transportation matching system application 120a can update a portion of the touch screen display 702a to include a change transportation type area 710. For example, utilizing the controls provided in the change transportation type area 710, the requestor can specify the type of transportation for a transportation request. In response to detecting a selection of at least one control in the change transportation type area 710, the transportation matching system application 120a detects yet another session event. Thus, in response to the newly detected session event, the transportation matching system application 120a provides further updated session information to the transportation matching system 102. The transportation matching system 102 then utilizes the session model 108 to determine a newly updated likelihood that the session on the requestor computing device 118a will result in a transportation request, and to potentially generate an updated upfront dispatch.

As discussed above, the transportation matching system 102 generates an upfront dispatch in response to a determination that a session on a requestor computing device will likely result in the generation of a transportation request. Depending on the strength of that determination and on the likely time-to-request, the transportation matching system 102 provides an indication of the generated upfront dispatch to the requestor computing device where the corresponding session information originated. For example, as shown in FIG. 7D, in response to determining the likelihood is above a threshold amount (e.g., more than 75% likely) and that time-to-request is within a predetermined amount of time (e.g., within 10 seconds), the transportation matching system 102 provides a route indication 712 and an ETA indication.

For instance, in one or more embodiments, the transportation matching system 102 provides the route indication 712 that includes a current location of the reserved provider computing device and a route that the reserved provider will take to arrive at the current location of the requestor computing device 118a. Additionally, the transportation matching system 102 provides the ETA indication 714 that indicates an amount of time that will elapse prior to the reserved provider computing device arriving at the current location of the requestor computing device 118a. As shown in FIG. 7D, the ETA indication 714 can provide identifying information related to the reserved provider computing device (e.g., a profile picture), and other information associated with the reserved provider computing device (e.g., the associated provider speaks Spanish).

Additionally, depending on the strength of the determination as to the likelihood that the current session with result in the generation of a transportation request and on the likely time-to-request, the transportation matching system 102 can provide various levels of dispatch to a provider computing device. For example, as shown in FIG. 7E, in response to determining that the likelihood is within a threshold amount (e.g., 60%-70% likely) and that the time-to-request is more than a predetermined amount of time (e.g., more than 60 seconds), the transportation matching system 102 provides the predicted dispatch information 716 and the predicted dispatch area map 718 on the touch screen display 702b of the provider computing device 122a. In one or more embodiments, the predicted dispatch information 716 informs the provider (e.g., the user of the provider computing device 122a) that one or more transportation requests are likely to originate from the area indicated by the predicted dispatch area map 718 within a specified time frame.

Figure 8:
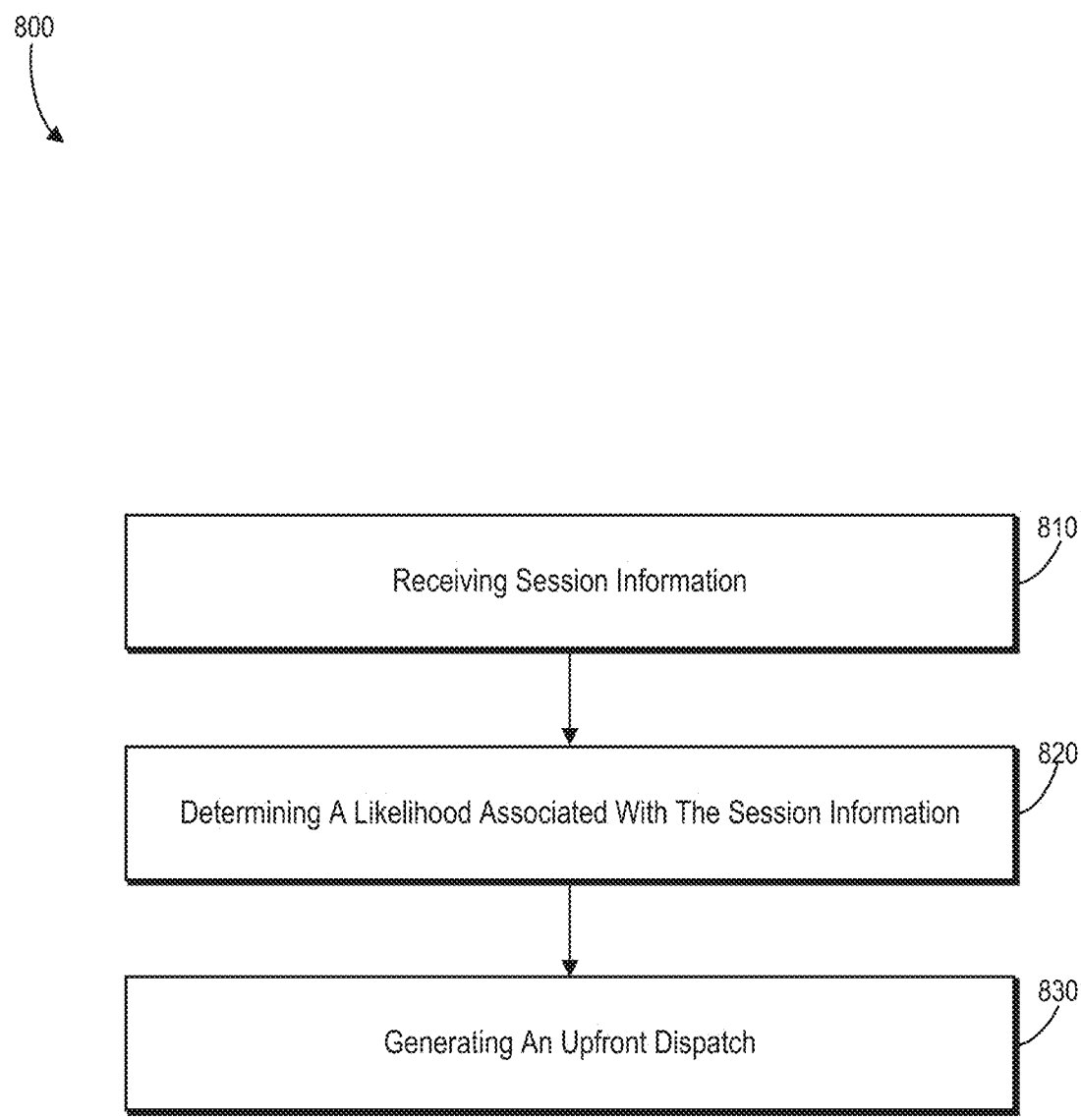
FIG. 8 illustrates a flowchart of a series of acts in a method of generating an upfront dispatch in accordance with one or more embodiments.

Turning now to FIG. 8, this figure illustrates a flowchart of a series of acts 800 of generating an upfront dispatch associated with a session. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions, that when executed by one or more processors, cause a computing device to perform the acts of FIG. 8. In still further embodiments, a system can perform the acts of FIG. 8.

As shown in FIG. 8, the series of acts 800 includes an act 810 of receiving session information. For example, the act 810 can involve receiving session information associated with a session of a transportation matching system application on a requestor computing device, the session information comprising an indication of one or more session events. For example, the session information can further include at least one of a current timestamp associated with the requestor computing device, a location of the requestor computing device, a pickup location, one or more previously session events associated with the transportation matching system application, or a current session length associated with the transportation matching system application. Additionally, the one or more session events can include one or more of an application open event, a set pickup event, a set destination event, a change ride type event, or an application close event.

As further shown in FIG. 8, the series of acts 800 includes an act 820 of determining a likelihood associated with the session information. For example, the act 820 can involve determining, based on the received session information, a likelihood that the session will result in a transportation request. In one or more embodiments, the determined likelihood is represented as a percentage.

Additionally, as shown in FIG. 8, the series of acts 800 includes an act 830 of generating an upfront dispatch. For example, the act 830 can involve generating, based on the determined likelihood and prior to receiving the transportation request, an upfront dispatch comprising a transportation match between the requestor computing device and a provider computing device. In one or more embodiments, the series of acts 800 includes an act of sending an indication of the upfront dispatch to the requestor computing device prior to receiving the transportation request from the requestor computing device. In that embodiment, generating the upfront dispatch includes submitting the session to a dispatch exchange that matches transportation requests to provider computing devices.

In one or more embodiments, the series of acts 800 includes an act of weighting the session within the dispatch exchange based on the determined likelihood that the session will result in a transportation request. For example, in at least one embodiment, the series of acts 800 further include acts of receiving a transportation request from the requestor computing device associated with the indication of the upfront dispatch, and automatically matching the transportation request to the provider computing device without providing the transportation request to the dispatch exchange.

In at least one embodiment, the series of acts 800 further includes an act of determining, based on the received session information, a predicted time until the transportation request is received from the requestor computing device. Additionally, the series of acts 800 can include an act of determining whether the predicted time satisfies a first threshold. In one or more embodiments, generating the upfront dispatch is in response to determining that the predicted time satisfies the first threshold.

Furthermore, the series of acts 800 can include an act of determining that the determined likelihood that the session will result in the transportation request meets a second threshold. In one or more embodiments, the series of acts 800 then includes an act of sending, in response to the likelihood meeting the second threshold, an indication of the upfront dispatch to the provider computing device.

In one or more embodiments, the series of acts 800 includes an act of receiving updated session information associated with the session of the transportation matching system application on the requestor computing device, the updated session information including an indication of one or more additional session events. The series of acts 800 can further include determining, based on the updated session information, an updated likelihood that the session will result in the transportation request. In one or more embodiments, the series of acts 800 then includes determining that the updated likelihood meets a third threshold, and dispatching, prior to receiving the transportation request, the provider computing device to the requestor computing device in response to determining that the updated likelihood meets the third threshold. In at least one embodiment, the series of acts 800 includes determining that the updated likelihood falls below a fourth threshold, and canceling the upfront dispatch in response to the updated likelihood falling below the threshold.

Figure 9:
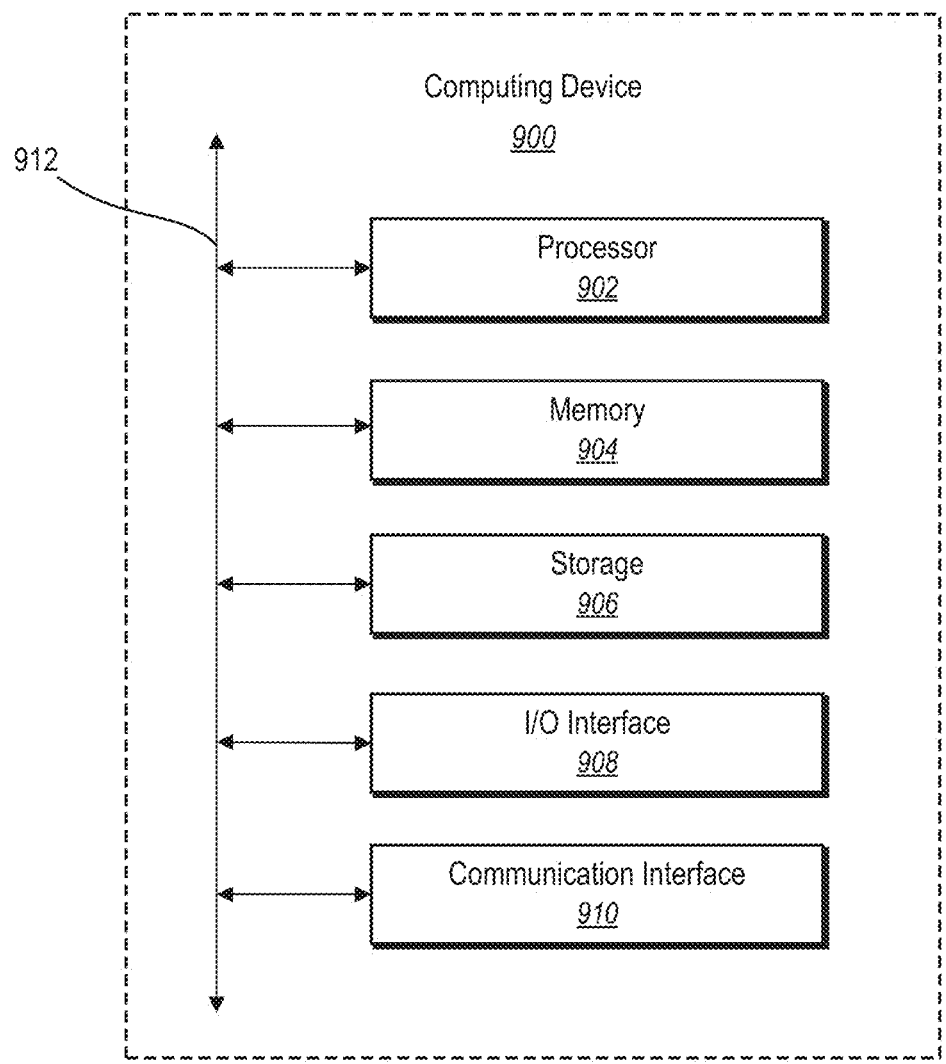
FIG. 9 illustrates a block diagram of an exemplary computing device in accordance with one or more embodiments.

FIG. 9 shows an example computing device 900, in accordance with various embodiments. In one or more embodiments, the computing device 900 may be used to implement any of the systems, devices, or methods described herein. In some embodiments, the computing system 900 may correspond to any of the various devices described herein, including, but not limited to, mobile devices, tablet computing devices, wearable devices, personal or laptop computers, vehicle-based computing devices, or other devices or systems described herein. As shown in FIG. 9, the computing device 900 can include various subsystems connected by a bus 902. The subsystems may include an I/O device subsystem 904, a display device subsystem 906, and a storage subsystem 910 including one or more computer readable storage media 908. The subsystems may also include a memory subsystem 912, a communication subsystem 920, and a processing subsystem 922.

In the computing system 900, the bus 902 facilitates communication between the various subsystems. Although a single bus 902 is shown, alternative bus configurations may also be used. The bus 902 may include any bus or other component to facilitate such communication as is known to one of ordinary skill in the art. Examples of such bus systems may include a local bus, parallel bus, serial bus, bus network, and/or multiple bus systems coordinated by a bus controller. The bus 902 may include one or more buses implementing various standards such as Parallel ATA, serial ATA, Industry Standard Architecture (ISA) bus, Extended ISA (EISA) bus, MicroChannel Architecture (MCA) bus, Peripheral Component Interconnect (PCI) bus, or any other architecture or standard as is known in the art.

In some embodiments, the I/O device subsystem 904 may include various input and/or output devices or interfaces for communication with such devices. Such devices may include, without limitation, a touch screen display or other touch-sensitive input device, a keyboard, a mouse, a trackball, a motion sensor or other movement-based gesture recognition device, a scroll wheel, a click wheel, a dial, a button, a switch, audio recognition devices configured to receive voice commands, microphones, image capture based devices such as eye activity monitors configured to recognize commands based on eye movement or blinking, and other types of input devices. The I/O device subsystem 904 may also include identification or authentication devices, such as fingerprint scanners, voiceprint scanners, iris scanners, or other biometric sensors or detectors. In various embodiments, the I/O device subsystem 904 may include audio output devices, such as speakers, media players, or other output devices.

The computing device 900 may include a display device subsystem 906. The display device subsystem 906 may include one or more lights, such as one or more light emitting diodes (LEDs), LED arrays, a liquid crystal display (LCD) or plasma display or other flat-screen display, a touch screen, a head-mounted display or other wearable display device, a projections device, a cathode ray tube (CRT), and any other display technology configured to visually convey information. In various embodiments, the display device subsystem 906 may include a controller and/or interface for controlling and/or communicating with an external display, such as any of the above-mentioned display technologies.

As shown in FIG. 9, the computing device 900 may include the storage subsystem 910 including various computer readable storage media 908, such as hard disk drives, solid state drives (including RAM-based and/or flash-based SSDs), or other storage devices. In one or more embodiments, the computer readable storage media 908 is configurable to store software, including programs, code, or other instructions, that is executable by a processor to provide functionality described herein. In some embodiments, the storage subsystem 910 may include various data stores or repositories or interface with various data stores or repositories that store data used with embodiments described herein. Such data stores may include, databases, object storage systems and services, data lakes or other data warehouse services or systems, distributed data stores, cloud-based storage systems and services, file systems, and any other data storage system or service. In some embodiments, the storage subsystem 910 can include a media reader, card reader, or other storage interface to communicate with one or more external and/or removable storage devices. In various embodiments, the computer readable storage media 908 can include any appropriate storage medium or combination of storage media. For example, the computer readable storage media 908 can include, but is not limited to, any one or more of random access memory (RAM), read only memory (ROM), electronically erasable programmable ROM (EEPROM), flash memory or other memory technology, optical storage (e.g., CD-ROM, DVD, Blu-ray® disk or other optical storage device), magnetic storage (e.g., tape drives, cassettes, magnetic disk storage or other magnetic storage devices). In some embodiments, the computer readable storage media 908 can include data signals or any other medium through which data can be sent and/or received.

The memory subsystem 912 can include various types of memory, including RAM, ROM, flash memory, or other memory. The memory subsystem 912 can include SRAM (static RAM) or DRAM (dynamic RAM). In some embodiments, the memory subsystem 912 can include a BIOS (basic input/output system) or other firmware configured to manage initialization of various components during for example startup. As shown in FIG. 9, the memory subsystem 912 can include applications 914 and application data 916.

The applications 914 may include programs, code, or other instructions, that can be executed by a processor. The applications 914 can include various applications such as browser clients, location management applications, ride management applications, data management application, and any other application. The application data 916 can include any data produced and/or consumed by the applications 914. The memory subsystem 912 can additionally include operating system, such as macOS®, Windows®, Linux®, various UNIX® or UNIX- or Linux-based operating systems or other operating systems.

The computing device 900 can also include a communication subsystem configured to facilitate communication between the computing device 900 and various external computer systems and/or networks (such as the Internet, a LAN, a WAN, a mobile network, or any other network). The communication subsystem can include hardware and/or software to enable communication over various wired (such as Ethernet or other wired communication technology) or wireless communication channels, such as radio transceivers to facilitate communication over wireless networks, mobile or cellular voice and/or data networks, WiFi networks, or other wireless communication networks. Additionally or alternatively, the communication subsystem can include hardware and/or software components to communicate with satellite-based or ground-based location services, such as GPS (global positioning system). In some embodiments, the communication subsystem may include, or interface with, various hardware or software sensors. The sensors may be configured to provide continuous and/or periodic data or data streams to a computer system through the communication subsystem.

Figure 10:
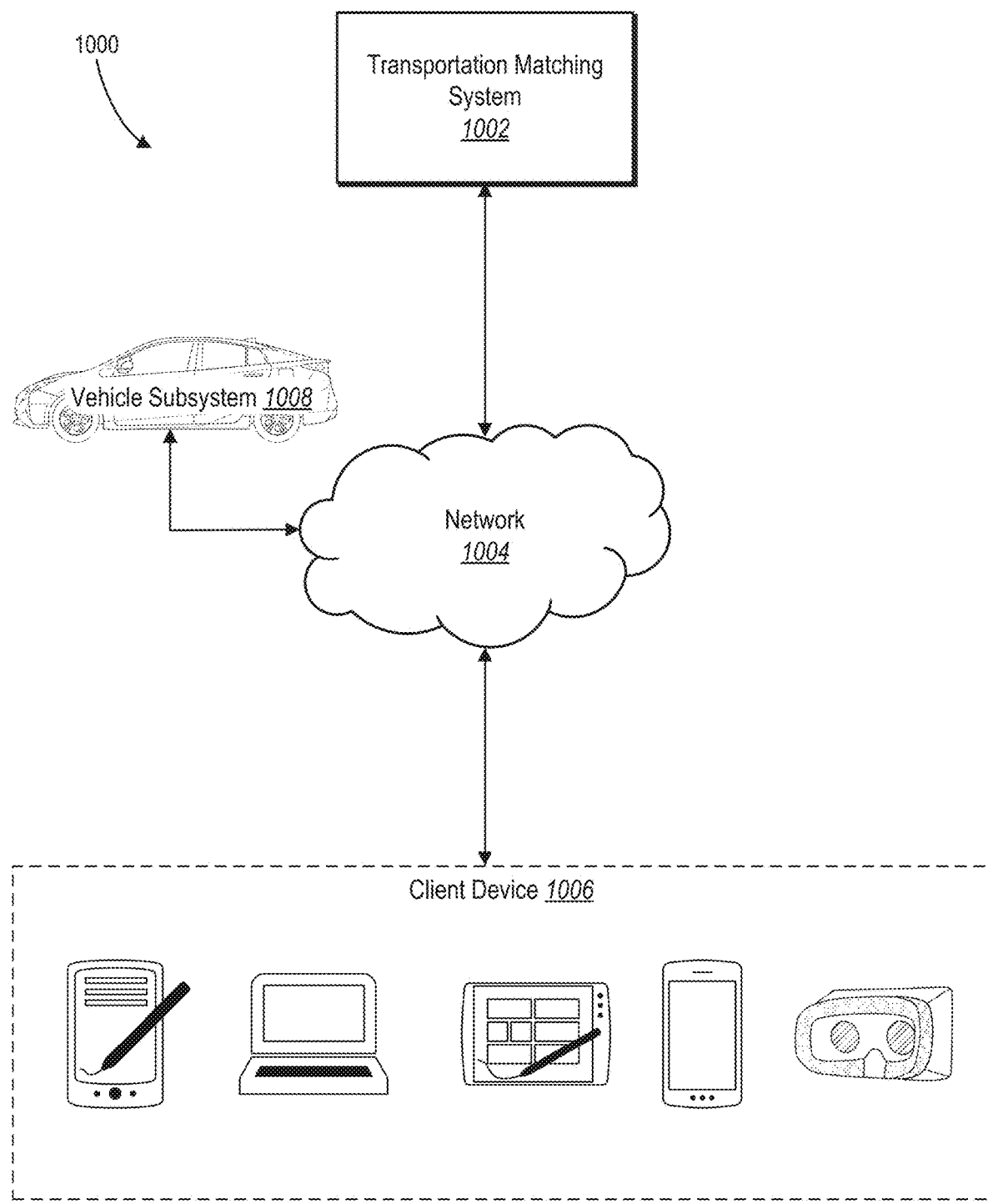
FIG. 10 illustrates an example network environment of a transportation matching system in accordance with one or more embodiments.

As shown in FIG. 9, the processing subsystem can include one or more processors or other devices operable to control the computing device 900. Such processors can include the single core processors, multi-core processors, which can include central processing units (CPUs), graphical processing units (GPUs), application specific integrated circuits (ASICs), digital signal processors (DSPs) or any other generalized or specialized microprocessor or integrated circuit. Various processors within processing subsystem may be used independently or in combination depending on the application FIG. 10 illustrates an example network environment 1000 of a transportation matching system (e.g., the transportation matching system 102). The network environment 1000 includes a client device 1006, a transportation matching system 1002, and a vehicle subsystem 1008 connected to each other by a network 1004. Although FIG. 10 illustrates a particular arrangement of the client device 1006, the transportation matching system 1002, the vehicle subsystem 1008, and the network 1004, this disclosure contemplates any suitable arrangement of the client device 1006, the transportation matching system 1002, the vehicle subsystem 1008, and the network 1004. As an example, and not by way of limitation, two or more of the client device 1006, the transportation matching system 1002, and the vehicle subsystem 1008 communicate directly, bypassing the network 1004. As another example, two or more of the client device 1006, the transportation matching system 1002, and the vehicle subsystem 1008 may be physically or logically co-located with each other in whole or in part. Moreover, although FIG. 10 illustrates a particular number of the client devices 1006, the transportation matching systems 1002, the vehicle subsystems 1008, and the networks 1004, this disclosure contemplates any suitable number of the client devices 1006, the transportation matching systems 1002, the vehicle subsystems 1008, and the networks 1004. As an example, and not by way of limitation, the network environment 1000 may include multiple client devices 1006, the transportation matching systems 1002, the vehicle subsystems 1008, and the networks 1004.

This disclosure contemplates any suitable network 1004. As an example, and not by way of limitation, one or more portions of the network 1004 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 1004 may include one or more networks 1004.

Links may connect the client device 1006, the transportation matching system 1002, and the vehicle subsystem 1008 to the communication network 1004 or to each other. This disclosure contemplates any suitable links. In particular embodiments, one or more links include one or more wireline (such as for example Digital Subscriber Line (DSL) or Data Over Cable Service Interface Specification (DOCSIS), wireless (such as for example Wi-Fi or Worldwide Interoperability for Microwave Access (WiMAX), or optical (such as for example Synchronous Optical Network (SONET) or Synchronous Digital Hierarchy (SDH) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout the network environment 1000. One or more first links may differ in one or more respects from one or more second links.

In particular embodiments, the client device 1006 may be an electronic device including hardware, software, or embedded logic components or a combination of two or more such components and capable of carrying out the appropriate functionalities implemented or supported by the client device 1006. As an example, and not by way of limitation, a client device 1006 may include any of the computing devices discussed above in relation to FIG. 8. A client device 1006 may enable a network user at the client device 1006 to access a network. A client device 1006 may enable its user to communicate with other users at other client systems 1006.

In particular embodiments, the client device 1006 may include a transportation service application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1006 may enter a Uniform Resource Locator (URL) or other address directing the web browser to a particular server (such as server), and the web browser may generate a Hyper Text Transfer Protocol (HTTP) request and communicate the HTTP request to server. The server may accept the HTTP request and communicate to client device 1006 one or more Hyper Text Markup Language (HTML) files responsive to the HTTP request. The client device 1006 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the transportation matching system 1002 may be a network-addressable computing system that can host a ride share transportation network. The transportation matching system 1002 may generate, store, receive, and send data, such as, for example, user-profile data, concept-profile data, text data, ride request data, GPS location data, provider data, requester data, vehicle data, or other suitable data related to the ride share transportation network. This may include authenticating the identity of providers and/or vehicles who are authorized to provide ride services through the transportation matching system 1002. In addition, the transportation service system may manage identities of service requestors such as users/requesters. In particular, the transportation service system may maintain requester data such as driving/riding histories, personal data, or other user data in addition to navigation and/or traffic management services or other location services (e.g., GPS services).

In particular embodiments, the transportation matching system 1002 may manage ride matching services to connect a user/requester with a vehicle and/or provider. By managing the ride matching services, the transportation matching system 1002 can manage the distribution and allocation of vehicle subsystem resources and user resources such as GPS location and availability indicators, as described herein.

The transportation matching system 1002 may be accessed by the other components of the network environment 1000 either directly or via network 1004. In particular embodiments, the transportation matching system 1002 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the transportation matching system 1002 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1006, or a transportation matching system 1002 to manage, retrieve, modify, add, or delete, the information stored in data store.

In particular embodiments, the transportation matching system 1002 may provide users with the ability to take actions on various types of items or objects, supported by the transportation matching system 1002. As an example, and not by way of limitation, the items and objects may include ride share networks to which users of the transportation matching system 1002 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the transportation matching system 1002 or by an external system of a third-party system, which is separate from the transportation matching system 1002 and coupled to the transportation matching system 1002 via a network 1004.

In particular embodiments, the transportation matching system 1002 may be capable of linking a variety of entities. As an example, and not by way of limitation, the transportation matching system 1002 may enable users to interact with each other or other entities, or to allow users to interact with these entities through an application programming interfaces (API) or other communication channels.

In particular embodiments, the transportation matching system 1002 may include a variety of servers, sub-systems, programs, modules, logs, and data stores. In particular embodiments, the transportation matching system 1002 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The transportation matching system 1002 may also include suitable components such as network interfaces, security mechanisms, load balancers, failover servers, management-and-network-operations consoles, other suitable components, or any suitable combination thereof. In particular embodiments, the transportation matching system 1002 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between the transportation matching system 1002 and one or more client systems 1006. An action logger may be used to receive communications from a web server about a user's actions on or off the transportation matching system 1002. In conjunction with the action log, a third-party-content-object log may be maintained of user exposures to third-party-content objects. A notification controller may provide information regarding content objects to a client device 1006. Information may be pushed to a client device 1006 as notifications, or information may be pulled from the client device 1006 responsive to a request received from the client device 1006. Authorization servers may be used to enforce one or more privacy settings of the users of the transportation matching system 1002. A privacy setting of a user determines how particular information associated with a user can be shared. The authorization server may allow users to opt in to or opt out of having their actions logged by the transportation matching system 1002 or shared with other systems, such as, for example, by setting appropriate privacy settings. Third-party-content-object stores may be used to store content objects received from third parties. Location stores may be used for storing location information received from the client systems 1006 associated with users.

In addition, the vehicle subsystem 1008 can include a human-operated vehicle or an autonomous vehicle. A provider of a human-operated vehicle can perform maneuvers to pick up, transport, and drop off one or more requesters according to the embodiments described herein. In certain embodiments, the vehicle subsystem 1008 can include an autonomous vehicle—i.e., a vehicle that does not require a human operator. In these embodiments, the vehicle subsystem 1008 can perform maneuvers, communicate, and otherwise function without the aid of a human provider, in accordance with available technology.

In particular embodiments, the vehicle subsystem 1008 may include one or more sensors incorporated therein or associated thereto. For example, sensor(s) can be mounted on the top of the vehicle subsystem 1008 or else can be located within the interior of the vehicle subsystem 1008. In certain embodiments, the sensor(s) can be located in multiple areas at once—i.e., split up throughout the vehicle subsystem 1008 so that different components of the sensor(s) can be placed in different locations in accordance with optimal operation of the sensor(s). In these embodiments, the sensor(s) can include a LIDAR sensor and an inertial measurement unit (IMU) including one or more accelerometers, one or more gyroscopes, and one or more magnetometers. The sensor suite can additionally or alternatively include a wireless IMU (WIMU), one or more cameras, one or more microphones, or other sensors or data input devices capable of receiving and/or recording information relating to navigating a route to pick up, transport, and/or drop off a requester.

In particular embodiments, the vehicle subsystem 1008 may include a communication device capable of communicating with the client device 1006 and/or the transportation matching system 1002. For example, the vehicle subsystem 1008 can include an on-board computing device communicatively linked to the network 1004 to transmit and receive data such as GPS location information, sensor-related information, requester location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A method comprising:
   training a session machine learning model to determine transportation request generation likelihoods based on training data comprising historical pre-transportation request user-initiated application events within a transportation matching system application;
   receiving, by one or more servers of a transportation matching system and from a transportation matching system application in an active session on a requestor computing device, a user-initiated application event comprising at least one of a user interface interaction with a pickup location selection element within the transportation matching system application, a user interface interaction with a destination location selection element within the transportation matching system application, or a user interface interaction with a transportation type selection element within the transportation matching system application;
   determining, by the one or more servers utilizing the session machine learning model, a likelihood that the requestor computing device will generate a transportation request associated with the active session based on the at least one of the user interface interaction with the pickup location selection element within the transportation matching system application, the user interface interaction with the destination location selection element within the transportation matching system application, or the user interface interaction with the transportation type selection element within the transportation matching system application;
   generating, based on the likelihood and prior to receiving the transportation request from the transportation matching system application on the requestor computing device, an upfront dispatch reserving a provider computing device for fulfilling the transportation request;
   causing the transportation matching system application on the requestor computing device to display, on the requestor computing device, information associated with the upfront dispatch; and
   re-training the session machine learning model based on causing the transportation matching system application on the requestor computing device to display the information associated with the upfront dispatch.

2. The method as recited in claim 1, further comprising:
   determining, by the one or more servers and based on the received user-initiated application event, a predicted time until the transportation request is received from the requestor computing device;
   determining, by the one or more servers, whether the predicted time satisfies a time threshold; and
   wherein generating the upfront dispatch is in response to determining that the predicted time satisfies the time threshold.

3. The method as recited in claim 1, further comprising:
   determining, by the one or more servers, that the likelihood that the requestor computing device will generate the transportation request meets an upfront dispatch threshold; and
   wherein causing the transportation matching system application on the requestor computing device to display information associated with the upfront dispatch is in response to the likelihood meeting the upfront dispatch threshold.

4. The method as recited in claim 1, further comprising:
   receiving, by the one or more servers, updated session information from within the active session of the transportation matching system application on the requestor computing device, the updated session information comprising additional user-initiated application events; and
   determining, by the one or more servers and based on the updated session information, an updated likelihood that the requestor computing device will generate the transportation request associated with the active session.

5. The method as recited in claim 4, further comprising:
   determining, by the one or more servers, that the updated likelihood meets an upfront dispatch threshold; and
   dispatching, by the one or more servers and prior to receiving the transportation request, the provider computing device to the requestor computing device in response to determining that the updated likelihood meets the upfront dispatch threshold.

6. The method as recited in claim 4, further comprising:
   determining, by the one or more servers, that the updated likelihood falls below a cancelation threshold; and
   canceling, by the one or more servers, the upfront dispatch in response to the updated likelihood falling below the cancelation threshold.

7. The method as recited in claim 4, wherein the additional user-initiated application events are associated with information comprising at least one of a current timestamp associated with the requestor computing device, a location of the requestor computing device, a pickup location, one or more previous session events associated with the transportation matching system application, or a current session length associated with the active session of the transportation matching system application.

8. The method as recited in claim 1, further comprising sending, by the one or more servers, an indication of the upfront dispatch to the requestor computing device prior to receiving the transportation request from the requestor computing device.

9. The method as recited in claim 8, wherein generating the upfront dispatch comprises submitting, by the one or more servers, the user-initiated application event to a dispatch exchange that matches transportation requests to provider computing devices.

10. The method as recited in claim 9, further comprising weighting the active session of the transportation matching system application within the dispatch exchange based on the likelihood that the requestor computing device will generate a transportation request associated with the active session.

11. The method as recited in claim 10, further comprising:
receiving, by the one or more servers, a transportation request from the requestor computing device associated with the displayed information associated with the upfront dispatch; and
automatically matching the transportation request, by the one or more servers, to the provider computing device without providing the transportation request to the dispatch exchange.

12. The method as recited in claim 1, further comprising:
generating, by the one or more servers, the upfront dispatch reserving the provider computing device by reserving the provider computing device for a reservation time threshold; and
canceling, by the one or more servers, the upfront dispatch in response to determining that the reservation time threshold is satisfied.

13. A system comprising:
at least one processor; and
at least one non-transitory computer-readable storage medium storing instructions thereon that, when executed by the at least one processor, cause the system to:
train a session machine learning model to determine transportation request generation likelihoods based on training data comprising historical pre-transportation request user-initiated application events within a transportation matching system application;
receive, from a transportation matching system application in an active session on a requestor computing device, a user-initiated application event comprising at least one of a user interface interaction with a pickup location selection element within the transportation matching system application, a user interface interaction with a destination location selection element within the transportation matching system application, or a user interface interaction with a transportation type selection element within the transportation matching system application;
determine, utilizing the session machine learning model, a likelihood that the requestor computing device will generate a transportation request associated with the active session based on the at least one of the user interface interaction with the pickup location selection element within the transportation matching system application, the user interface interaction with the destination location selection element within the transportation matching system application, or the user interface interaction with the transportation type selection element within the transportation matching system application;
generate, based on the likelihood and prior to receiving the transportation request from the transportation matching system application on the requestor computing device, an upfront dispatch reserving a provider computing device for fulfilling the transportation request;
cause the transportation matching system application on the requestor computing device to display, on the requestor computing device, information associated with the upfront dispatch; and
re-train the session machine learning model based on causing the transportation matching system application on the requestor computing device to display the information associated with the upfront dispatch.

14. The system as recited in claim 13, further storing instructions thereon that, when executed by the at least one processor, cause the system to:
determine, based on the received user-initiated application event, a predicted time until the transportation request is received from the requestor computing device;
determine whether the predicted time satisfies a time threshold; and
wherein generating the upfront dispatch is in response to determining that the predicted time satisfies the time threshold.

15. The system as recited in claim 13, further storing instructions thereon that, when executed by the at least one processor, cause the system to:
determine that the likelihood that the requestor computing device will generate the transportation request meets an upfront dispatch threshold; and
wherein causing the transportation matching system application on the requestor computing device to display information associated with the upfront dispatch is in response to the likelihood meeting the upfront dispatch threshold.

16. The system as recited in claim 13, further storing instructions thereon that, when executed by the at least one processor, cause the system to:
receive updated session information from within the active session of the transportation matching system application on the requestor computing device, the updated session information comprising additional user-initiated application events; and
determine, based on the updated session information, an updated likelihood that the requestor computing device will generate the transportation request associated with the active session.

17. The system as recited in claim 16, further storing instructions thereon that, when executed by the at least one processor, cause the system to:
determine that the updated likelihood meets an upfront dispatch threshold; and
dispatch, prior to receiving the transportation request, the provider computing device to the requestor computing device in response to determining that the updated likelihood meets the upfront dispatch threshold.

18. The system as recited in claim 16, further storing instructions thereon that, when executed by the at least one processor, cause the system to:
determine that the updated likelihood falls below a cancelation threshold; and
cancel the upfront dispatch in response to the updated likelihood falling below the cancelation threshold.

19. The system as recited in claim 18, further storing instructions thereon that, when executed by the at least one processor, cause the system to send an indication of the upfront dispatch to the requestor computing device prior to receiving the transportation request from the requestor computing device.

20. A non-transitory computer-readable medium storing instructions thereon that, when executed by at least one processor, cause a system to:
train a session machine learning model to determine transportation request generation likelihoods based on training data comprising historical pre-transportation request user-initiated application events within a transportation matching system application;

receive, from a transportation matching system application in an active session on a requestor computing device, a user-initiated application event comprising at least one of a user interface interaction with a pickup location selection element within the transportation matching system application, a user interface interaction with destination location selection element within the transportation matching system application, or a user interface interaction with transportation type selection element within the transportation matching system application;

determine, utilizing the session machine learning model, a likelihood that the requestor computing device will generate a transportation request associated with the active session based on the at least one of the user interface interaction with the pickup location selection element within the transportation matching system application, the user interface interaction with the destination location selection element within the transportation matching system application, or the user interface interaction with the transportation type selection element within the transportation matching system application;

generate, based on the likelihood and prior to receiving the transportation request from the transportation matching system application on the requestor computing device, an upfront dispatch reserving a provider computing device for fulfilling the transportation request;

cause the transportation matching system application on the requestor computing device to display, on the requestor computing device, information associated with the upfront dispatch; and re-train the session machine learning model based on causing the transportation matching system application on the requestor computing device to display the information associated with the upfront dispatch.

* * * * *